United States Patent
McGarian

(10) Patent No.: US 12,055,258 B2
(45) Date of Patent: Aug. 6, 2024

(54) APPARATUS FOR SEALING A PIPE

(71) Applicant: Bruce McGarian, Stonehaven (GB)

(72) Inventor: Bruce McGarian, Stonehaven (GB)

(*) Notice: Subject to any disclaimer, the term of this patent is extended or adjusted under 35 U.S.C. 154(b) by 0 days.

(21) Appl. No.: 17/348,601

(22) Filed: Jun. 15, 2021

(65) Prior Publication Data

US 2021/0310596 A1    Oct. 7, 2021

Related U.S. Application Data

(62) Division of application No. 16/341,001, filed as application No. PCT/GB2017/053083 on Oct. 12, 2017, now abandoned.

(30) Foreign Application Priority Data

| Oct. 14, 2016 | (GB) | 1617523 |
| Oct. 21, 2016 | (GB) | 1617865 |
| Sep. 4, 2017 | (GB) | 1714124 |

(51) Int. Cl.
*F16L 55/11* (2006.01)
*F16K 5/02* (2006.01)
(Continued)

(52) U.S. Cl.
CPC ............ *F16L 55/1108* (2013.01); *F16K 5/02* (2013.01); *F16L 21/04* (2013.01); *F16L 55/07* (2013.01); *F16L 55/1141* (2013.01)

(58) Field of Classification Search
CPC .... F16L 55/1108; F16L 55/07; F16L 55/1141; F16L 21/04; F16K 5/02
(Continued)

(56) References Cited

U.S. PATENT DOCUMENTS

| 1,509,643 A | * | 9/1924 | Forsberg | E21B 33/03 |
| | | | | 166/88.1 |
| 2,230,468 A | * | 2/1941 | Pfefferle | F16L 21/04 |
| | | | | 285/423 |

(Continued)

FOREIGN PATENT DOCUMENTS

| CN | 201351789 | 11/2009 |
| CN | 203023730 | 6/2013 |

(Continued)

OTHER PUBLICATIONS

Combined Search and Examination Report dated Mar. 6, 2017, from Great Britain Patent Application No. GB1617523.4, 7 pp.
(Continued)

*Primary Examiner* — Patrick F Brinson
(74) *Attorney, Agent, or Firm* — Klarquist Sparkman, LLP

(57) ABSTRACT

A sealing device for sealing a free end of a generally tubular object, the sealing device comprising: a main body comprising either a sleeve which may, when the sealing device is engaged with the free end of a generally tubular object, surround the free end of the generally tubular object, or a protrusion which may, when the sealing device is engaged with the free end of the generally tubular object, be inserted into the interior of the free end of the generally tubular object; a grip arrangement which is connected to or supported by the main body, and positioned to lie against or adjacent a surface of the generally tubular object when the sealing device is engaged with the free end of the generally tubular object, wherein the grip arrangement is radially moveable with respect to a central axis of the main body; and a grip drive arrangement operable to drive the grip arrangement radially with respect to the central axis of the
(Continued)

main body, towards the surface of the generally tubular object.

12 Claims, 16 Drawing Sheets

(51) Int. Cl.
*F16L 21/04* (2006.01)
*F16L 55/07* (2006.01)

(58) Field of Classification Search
USPC .................................................... 138/89, 90
See application file for complete search history.

(56) References Cited

U.S. PATENT DOCUMENTS

| | | | | |
|---|---|---|---|---|
| 2,334,303 A | * | 11/1943 | Allen | E21B 33/04 73/40.5 R |
| 2,526,172 A | | 10/1950 | Sunde | |
| 2,886,067 A | * | 5/1959 | Maxwell | G01M 3/022 138/90 |
| 3,107,696 A | * | 10/1963 | Ver Nooy | F16L 55/1283 166/120 |
| 3,326,243 A | | 6/1967 | Augustus | |
| 3,765,560 A | * | 10/1973 | Kemp | G01M 3/022 138/90 |
| 3,844,313 A | * | 10/1974 | Arnold | F16L 37/002 403/5 |
| 3,941,410 A | | 3/1976 | Miyaoka | |
| 3,963,054 A | | 6/1976 | Martin | |
| 4,127,289 A | | 11/1978 | Daspit | |
| 4,254,801 A | | 3/1981 | Gerthoffer et al. | |
| 4,330,143 A | | 5/1982 | Reneau | |
| 4,381,800 A | | 5/1983 | Leslie | |
| 4,415,005 A | * | 11/1983 | Janzen | E21B 17/006 138/96 T |
| 4,506,705 A | * | 3/1985 | Thompson | F16L 55/132 138/89 |
| 4,768,560 A | * | 9/1988 | Logsdon | F16L 55/132 138/90 |
| 4,982,763 A | * | 1/1991 | Klahn | F16L 55/13 138/90 |
| 5,676,174 A | | 10/1997 | Berneski, Jr. et al. | |
| 6,029,709 A | * | 2/2000 | Burgess | F16L 55/11 138/90 |
| 2011/0126933 A1 | * | 6/2011 | Bowie | F16L 55/132 138/90 |
| 2012/0067597 A1 | | 3/2012 | Lang et al. | |
| 2014/0216716 A1 | | 8/2014 | Nielson | |
| 2015/0362114 A1 | * | 12/2015 | Berube | F16L 55/1108 138/89 |

FOREIGN PATENT DOCUMENTS

| | | |
|---|---|---|
| CN | 105546267 | 5/2016 |
| DE | 867188 | 2/1953 |
| GB | 722040 | 1/1955 |
| GB | 1258369 | 12/1971 |
| GB | 1297234 | 11/1972 |
| JP | H10-318480 | 12/1998 |

OTHER PUBLICATIONS

International Search Report and Written Opinion dated Jan. 4, 2018, from International Patent Application No. PCT/GB2017/053083, 11 pp.

Search Report dated Mar. 28, 2017, from Great Britain Patent Application No. GB1617865.9, 5 pp.

Search Report dated Jan. 16, 2018, from Great Britain Patent Application No. GB1714124.3, 5 pp.

* cited by examiner

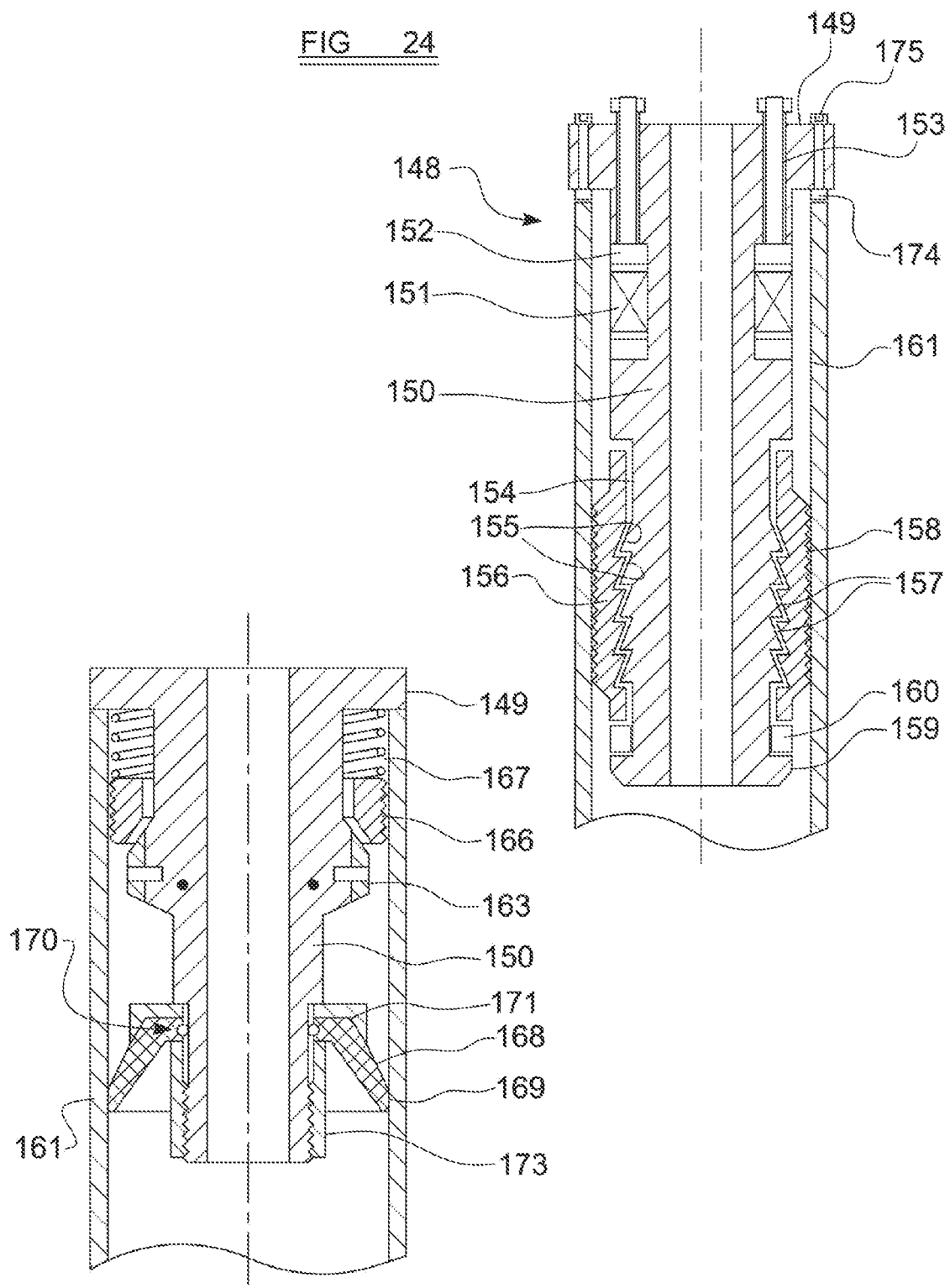

APPARATUS FOR SEALING A PIPE

CROSS REFERENCE TO RELATED APPLICATIONS

This application is a divisional of U.S. patent application Ser. No. 16/341,001, filed Apr. 10, 2019, which is the U.S. National Stage of International Application No. PCT/GB2017/053083, filed Oct. 12, 2017, which was published in English under PCT Article 21(2), which in turn claims priority to and the benefit of Great Britain Application Nos. 1617523.4, filed Oct. 14, 2016, 1617865.9, filed Oct. 21, 2016, and 1714124.3, filed Sep. 4, 2017, all of which are incorporated herein in their entirety.

DESCRIPTION

When a wellbore is drilled, for instance in the course of oil-field exploration, a casing is generally installed in the wellbore. The casing comprises a lining, which will generally be circular in cross-section, formed from a robust material such as steel.

If a wellbore has been abandoned, a section of casing may protrude upwardly from the ground, or from the sea bed, depending on the type of wellbore.

It is generally desirable to seal the open end of such a casing. Known devices for this purpose are disclosed in U.S. Pat. Nos. 6,845,815 and 8,813,853.

Prior art systems generally rely on attaching at least one feature of the device to the well-head profile of the casing, i.e. the shape of the very top end of the casing. However, the end of the casing may be fractured or otherwise damaged, or for various reasons it may be necessary to seal a casing at an open end which does not have any particular profile.

It is an object of the present invention to provide an improved apparatus for sealing the open end of a casing.

Accordingly, one aspect of the present invention comprises a sealing device for sealing a free end of a generally tubular object, the sealing device comprising: a main body comprising either a sleeve which may, when the sealing device is engaged with the free end of a generally tubular object, surround the free end of the generally tubular object, or a protrusion which may, when the sealing device is engaged with the free end of the generally tubular object, be inserted into the interior of the free end of the generally tubular object; a grip arrangement which is connected to or supported by the main body, and positioned to lie against or adjacent a surface of the generally tubular object when the sealing device is engaged with the free end of the generally tubular object, wherein the grip arrangement is radially moveable with respect to a central axis of the main body; and a grip drive arrangement operable to drive the grip arrangement radially with respect to the central axis of the main body, towards the surface of the generally tubular object.

Advantageously, the sealing device further comprises a seal element which is connected to, or supported by, the main body, and which is adapted to form a fluid-tight or substantially fluid-tight seal between the main body and a surface of the generally tubular object.

Preferably, in a first configuration, the seal element is relatively uncompressed and lies at a first radial distance from the central axis of the device, and in a second configuration is relatively compressed, and extends further radially inwardly towards, or further radially outwardly from, the central axis of the device.

Conveniently, the sealing device further comprises a seal compression arrangement which is operable to apply a compressive force on the seal element, to move the seal element from the first configuration to the second configuration thereof.

Advantageously, one or more anti-extrusion rings are positioned adjacent the seal element.

Preferably, the seal compression arrangement is also the grip drive arrangement.

Conveniently, the seal element is substantially conical, being tapered between a first edge, which is connected to a part of the sealing device, and a second edge, which extends radially inwardly or outwardly from the part of the sealing device.

Advantageously, the main body comprises a protrusion which may be inserted into the interior of the free end of the generally tubular object, and wherein the seal element is provided on the protrusion, and may press against the inner wall of the generally tubular object.

Preferably, the main body comprises a sleeve which may surround the free end of the generally tubular object, and wherein the seal element is provided on the sleeve, and may press against the outer wall of the generally tubular object.

Conveniently, the sealing device further comprises a tapered deflection surface which is positioned to interact with the grip arrangement, wherein the grip arrangement and the deflection surface are axially moveable relative to each other.

Advantageously, the grip drive arrangement is operable to drive the grip arrangement and the deflection surface axially with respect to one another, such that the grip arrangement is radially deflected by the deflection surface with respect to the central axis of the main body.

Preferably, the deflection surface comprises a conical or substantially conical surface which forms part of, or is supported by, the main body.

Conveniently, the deflection surface comprises a plurality of separate, spaced apart deflection surfaces.

Advantageously, the grip arrangement comprises a plurality of separate grip elements, each of which is mounted for movement with respect to a respective one of the deflection surfaces.

Preferably, the deflection surface comprises two or more turns of a helical or substantially helical track, and wherein the grip arrangement comprises a corresponding helical surface against which the track may bear.

Conveniently, the main body is formed in two parts which are axially movable with respect to one another, and the grip drive arrangement is operable to drive axial movement between the two parts of the main body.

Advantageously, the grip drive arrangement comprises one or more bolts, studs or screws which connect the two parts of the main body.

Preferably, the grip drive arrangement comprises a rotatable drive element, which may be rotated with respect to the central axis of the main body, the rotatable drive element having one or more axially inclined faces which may drive axial motion of the grip arrangement as the rotatable drive element is rotated.

Conveniently, the grip drive arrangement comprises one or more drive elements that may be driven to move in a radial direction, or a direction having a radial component, with respect to the central axis of the device, each drive element being positioned to interact with the grip arrangement to push against the grip arrangement during radial motion of the drive element.

Advantageously, each drive element comprises a screw that may be advanced or retracted with respect to the grip arrangement.

Preferably, the sealing device is engaged with the free end of the generally tubular object, if a force is exerted on the main body to remove the main body from the free end of the generally tubular object, the force will tend to move the deflection surface with respect to the grip arrangement so that the grip arrangement is moved further radially inwardly towards the central axis of the main body, if the grip arrangement is positioned to lie against or adjacent the outer surface of the generally tubular object, or further radially outwardly away from the central axis of the main body, if the grip arrangement is positioned to lie against or adjacent the inner surface of the generally tubular object.

Conveniently, the sealing device comprises two deflection surfaces that are tapered in opposite directions, and wherein both of the deflection surfaces are operable to interact with the grip arrangement to drive the grip arrangement radially inwardly with respect to the central axis of the device, if the grip arrangement is positioned to lie against or adjacent the outer surface of the generally tubular object, or radially outwardly away from the central axis of the main body, if the grip arrangement is positioned to lie against or adjacent the inner surface of the generally tubular object.

Advantageously, the two deflection surfaces are positioned axially on either side of the grip arrangement.

Preferably, the sealing device further comprises a holding arrangement which is operable selectively to prevent axial movement of the grip arrangement.

Conveniently, the holding arrangement comprises one or more elements which are operable to engage with the grip arrangement once the grip arrangement is in a desired axial location.

Advantageously, the sealing device further comprises an adjustable axial limiting arrangement, operable to prevent axial movement of the grip arrangement or of the deflection surface beyond an adjustable limit.

Preferably, the axial limiting arrangement comprises one or more screws which may be advanced or retracted with respect to the main body, and which the grip arrangement or of the deflection surface will contact at a point in the axial movement thereof, thus preventing further axial movement thereof.

Conveniently, the grip drive arrangement comprises one or more elements which may move in a radial or substantially radial direction, with respect to the central axis of the main body, to drive the grip arrangement towards the surface of the generally tubular element.

Advantageously, the grip drive arrangement comprises a rotatable drive element, which may be rotated with respect to the central axis of the main body, the rotatable drive element having one or more radially inclined faces which may drive radial motion of the grip arrangement as the rotatable drive element is rotated.

Preferably, the grip drive arrangement comprises one or more actuators.

Conveniently, the one or more actuators are hydraulic actuators.

Advantageously, the one or more actuators are arranged to exert a force on the grip arrangement in a direction that is axial or substantially axial with respect to the main body.

Preferably, the one or more actuators are arranged to exert a force on the grip arrangement in a direction that is radial or substantially radial with respect to the central axis of the main body.

Conveniently, the sealing device further comprises a retaining arrangement that is operable selectively to hold the grip arrangement at a certain radial distance from the central axis of the main body, and prevent the grip arrangement from moving radially closer to the central axis of the main body than the certain distance, if the grip arrangement is positioned to lie against or adjacent the outer surface of the generally tubular object, or to prevent the grip arrangement from moving radially further from the central axis of the main body, if the grip arrangement is positioned to lie against or adjacent the inner surface of the generally tubular object.

Advantageously, the retaining arrangement comprises one or more screws which may be engaged with the grip arrangement, and which may be held in place with respect to the main body.

Preferably, the sealing device comprises two axially spaced-apart grip arrangements.

Conveniently, the two grip arrangements are arranged to lie against or adjacent respective surfaces of two coaxially arranged generally tubular objects, one of which has a greater diameter than the other, and comprising respective grip drive arrangements operable independently to drive the grip arrangements radially with respect to the central axis of the main body, towards the surfaces of the generally tubular objects.

Advantageously, the grip arrangement comprises at least one grip surface having a curvature which matches or substantially matches the curvature of the generally tubular object.

Preferably, the at least one grip surface extends both axially and circumferentially.

Conveniently, the at least one grip surface extends both axially and circumferentially for a distance of at least 3 cm, and more preferably for a distance of at least 10 cm.

Advantageously, the main body has an aperture formed therethrough, to allow fluid or a tool or work string to pass through the main body from one end thereof to the other.

Preferably, the main body has a connection arrangement to allow a further component to be connected to the main body, so that the further component has access to the aperture.

Conveniently, the connection arrangement comprises a series of connection apertures or protrusions and/or a sealing arrangement formed on or through a surface of the main body.

Advantageously, the main body has a first end which is closed or substantially closed, and does not allow the passage of fluid therethrough.

Preferably, the main body has a pressure gauge or valve arrangement extending therethrough, to allow pressure within the to be monitored from outside the device, or to allow fluid to be pumped into or removed from the interior of the generally tubular object, and preferably wherein who pressure gauges or valve arrangements extend through the main body.

Conveniently, the device comprises a cover to fit over the free end of the generally tubular object and to seal entirely or substantially entirely the free end of the generally tubular object.

Advantageously, the main body comprises a protrusion which may be inserted into the interior of the free end of the generally tubular object, and wherein the cover comprises a flange that protrudes radially outwardly beyond the protrusion.

Preferably, the main body comprises a sleeve which may surround the free end of the generally tubular object, and wherein the sleeve protrudes from the cover so the sleeve and cover take the form of a cap.

Conveniently, the main body comprises a protrusion which may be inserted into the interior of the free end of the generally tubular object, and wherein the grip arrangement is positioned on or around the exterior of the protrusion.

Advantageously, the main body comprises a sleeve which may surround the free end of the generally tubular object, and wherein the grip arrangement is positioned on or around the interior of the sleeve.

Preferably, the sealing device is for use with a hollow outer casing with an inner casing positioned within the outer casing, wherein the outer casing is the generally tubular object, and wherein the sealing device further comprises a flow diverter to prevent fluid within the sealing device from entering the inner casing.

Conveniently, the flow diverter blocks the entrance of the inner casing, and is biased against the interior of the main body.

Advantageously, the sealing device comprises both a sleeve which may surround the free end of the generally tubular object, and a which may be inserted into the interior of the free end of the generally tubular object, wherein the sleeve and the protrusion are spaced apart from each other.

Preferably, at least one motion of the grip drive arrangement may be reversed, to allow the grip arrangement to move radially away from the surface of the generally tubular object.

Conveniently, the sealing device further comprises a stop member, arranged so that, when the sealing device is engaged with the free end of the generally tubular object, the stop member arrests relative motion of the generally tubular object with respect to the sleeve or the protrusion of the sealing device, and when the grip drive arrangement is operated to drive the grip arrangement radially towards the surface of the generally tubular object, the stop member allows further relative movement of the generally tubular object with respect to the sleeve or the protrusion of the sealing device.

Advantageously, the stop member is a resilient member, arranged so that, when the sealing device is engaged with a first level of force with the free end of the generally tubular object, the resilient member arrests relative motion of the generally tubular object with respect to the sleeve or the protrusion of the sealing device, and when the grip drive arrangement is operated to drive the grip arrangement radially towards the surface of the generally tubular object, the resilient member deforms to allow further relative movement of the generally tubular object with respect to the sleeve or the protrusion of the sealing device.

Preferably, the resilient member comprises a spring.

Conveniently, the stop member comprises a member with an adjustable height, which may be set to a first height when the sealing device is engaged with the free end of the generally tubular object, and which may then be set to a second height, to allow further relative movement of the generally tubular object with respect to the sleeve or the protrusion of the sealing device when the grip drive arrangement is operated to drive the grip arrangement radially towards the surface of the generally tubular object.

Advantageously, the first height is greater than the second height.

Preferably, the stop member is hydraulically operated.

Another aspect of the present invention provides a method of sealing the free end of a generally tubular object, comprising the steps of: providing a sealing device according to any of the above; engaging the device with the free end of the generally tubular object; and activating the grip drive arrangement to drive the grip arrangement radially with respect to the main body, and with respect to the central axis of the main body, towards the surface of the generally tubular object.

Conveniently, the seal compression arrangement is operated to apply a compressive force on the seal element, to move the seal element from the first configuration to the second configuration thereof so that the seal element presses against the outer or inner surface of the generally tubular object, thus forming a seal around the generally tubular object.

Advantageously, the second edge lies against or adjacent the generally tubular object, and wherein pressurised fluid within the generally tubular object on the far side of the seal element from the free end of the generally tubular object will tend to drive the second edge into closer engagement with the generally tubular object.

Preferably, the method further comprises moving the grip drive arrangement in the reverse manner, to allow the grip arrangement to move radially away from the surface of the generally tubular object, as part of a removal process to remove the sealing device from the free end of the generally tubular object.

Conveniently, when the sealing device is fully engaged with the free end of the generally tubular object, the free end of the generally tubular object contacts a part of the sealing device at a first longitudinal position, and the method further comprises the step, before activating the grip drive arrangement, of engaging the sealing device with the free end of the generally tubular object so that the free end of the generally tubular object is spaced apart from the part of the sealing device, in a second longitudinal position which is spaced at a distance from the first longitudinal position.

Advantageously, the step of activating the grip drive arrangement is carried out, the free end of the generally tubular object moves from the second longitudinal position, relative to the sealing device, towards the first longitudinal position.

A further aspect of the invention provides a method of removing a sealing device according to the above from the free end of a generally tubular object, comprising the step of moving the grip drive arrangement in the reverse manner, to allow the grip arrangement to move radially away from the surface of the generally tubular object, as part of a removal process to remove the sealing device from the free end of the generally tubular object.

In order that the present invention may be more readily understood, the embodiments throughout will now be described, by way of example, with reference to the accompanying drawings, in which:

FIGS. 21 to 25 show components of further sealing devices embodying the present invention.

Figure 1:
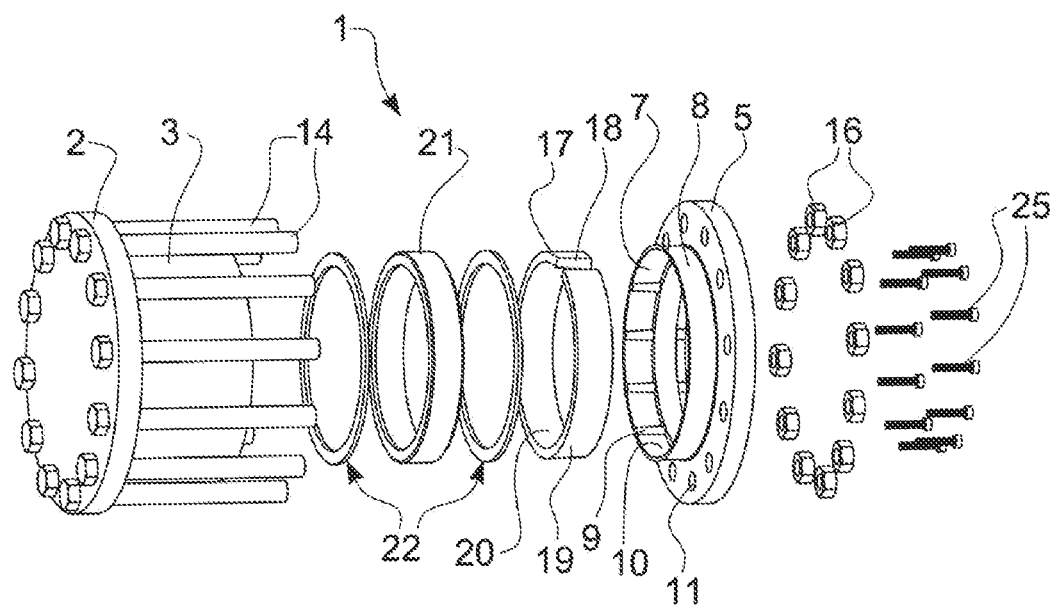
FIGS. 1 and 2 show components of a first sealing device embodying the present invention, in exploded view.
Figure 2:
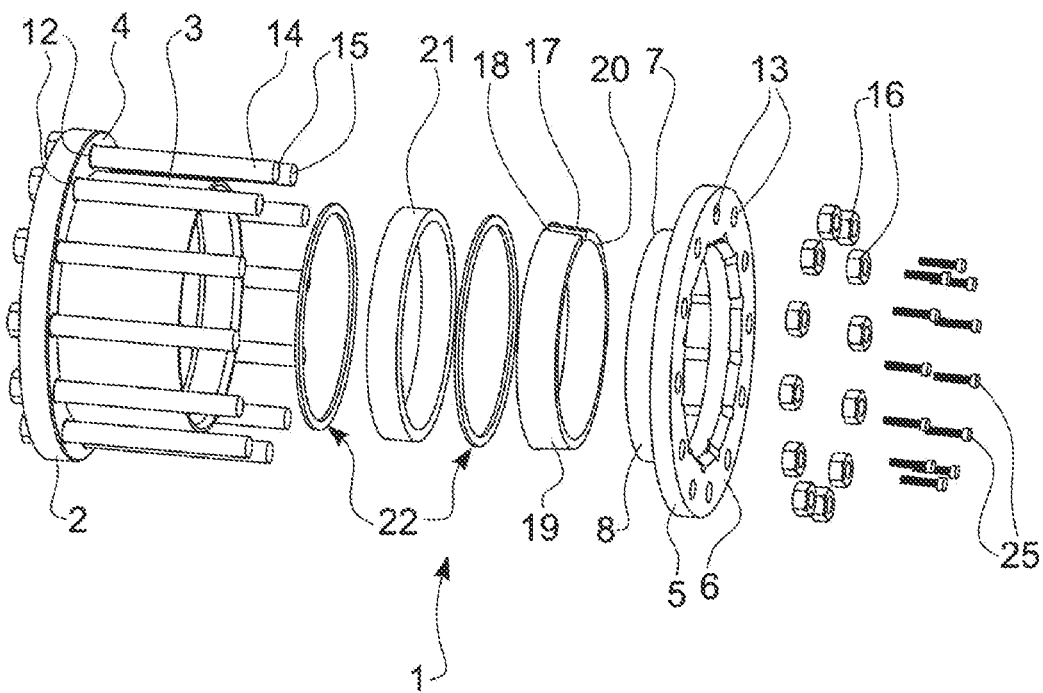

With reference firstly to FIGS. 1 and 2, respective exploded views are shown of a first sealing device 1 embodying the present invention.

The first sealing device 1 comprises an upper flange 2, which in the example shown is generally circular and planar. A retaining cylinder 3 protrudes from one side of the upper flange 2, and is co-axial or substantially co-axial therewith. The diameter of the retaining cylinder 3 is less than that of the upper flange 2, so that the upper flange 2 extends outwardly beyond the retaining cylinder 3, presenting an annular surface 4.

Preferably, the upper flange 2 and retaining cylinder 3 are integrally formed with one another. In other embodiments, however, these two components may be attached robustly to each other by any suitable method, for instance by welding.

The retaining cylinder 3 is hollow, and the end therefore which is furthest from the upper flange 2 is open.

The first sealing device 1 further comprises a lower flange 5. The lower flange 5 is once again preferably generally planar and circular, and has a central aperture 6 formed therethrough.

A guidance protrusion 7 extends outwardly from one side of the lower flange 5. The guidance protrusion 7 has, in the embodiment shown, a cylindrical or substantially cylindrical outer wall 8. The outer diameter of the guidance protrusion 7 is less than the inner diameter of the retaining cylinder 3 that extends from the upper flange 2. This means that the guidance protrusion 7 can fit into the open end of the retaining cylinder protrusion 3, as will be discussed in more detail below.

The guidance protrusion 7 is, in the embodiment shown, significantly shorter than the retaining cylinder 3.

The inner surface of the guidance protrusion 7 has a tapering configuration, being widest at its open end furthest from the lower flange 5, and narrowing towards the point where the guidance protrusion 7 meets the main part of the lower flange 5.

In some embodiments, the entire inner wall of the guidance protrusion 7 may be inclined with respect to a central axis of the lower flange 5. In other examples, as shown in FIGS. 1 and 2, a series of spaced-apart inclined protrusions 9 may extend inwardly from the inner surface of the inner wall 10 of the guidance protrusion 7.

In preferred embodiments the central aperture 6 that passes through the lower flange 5 is of the same or substantially the same width as the interior of the guidance protrusion 7. Preferably, the central aperture 6 is relatively wide compared to the overall diameter of the lower flange 5, and may, for instance, be at least half of the overall diameter of the lower flange 5, and more preferably at least two-thirds of the overall diameter of the lower flange 5.

Once again, the guidance protrusion 7 may be formed integrally with the lower flange 5, or robustly attach thereto by welding or any other suitable means.

On the side of the lower flange 5 from which the guidance protrusion 7 extends, an annular surface 11 surrounds the guidance protrusion 7.

Corresponding spaced-apart holes 12, 13 are formed through the annular surfaces 4, 11 of the upper and lower flanges 2, 5.

Elongate fastening bolts 14 are passed through the holes 12 formed in the upper flange 2, passing from the side from which the retaining cylinder 3 does not extend and extending alongside the retaining cylinder 3. The upper and lower flanges 2, 5 may be attached together by fitting the guidance protrusion 7 into the open end of the retaining cylinder 3, and passing the free ends 15 of the fastening bolts 14 through the holes 13 that are formed in the annular face 11 of the lower flange 5. Suitable nuts 16 may then be threaded on to the free ends 15 of the fastening bolts 14 to hold the upper and lower flanges 2, 5 together.

In other embodiments, fastening studs may be used instead of the fastening bolts 14.

The first sealing device 1 further includes a slip ring 17. The slip ring 17 is generally cylindrical in configuration, but has a gap 18 formed part of the way around its circumference to allow the diameter of the slip ring 17 to expand and contract.

The outer wall 19 of the slip ring 17 is tapered, so that the outer diameter of the slip ring 17 is greater on one side than the other. In preferred embodiments the angle of taper is around 5°, although the present invention is not limited to this, and any suitable taper angle can be used.

The inner wall 20 of the slip ring 17 is preferably cylindrical in configuration, and is not tapered. The inner wall 20 also has a gripping arrangement formed thereon. In preferred embodiments, the gripping arrangement takes the form of a number of spaced-apart circular ribs or ridges formed on the inner wall 20. The peaks of these ribs or ridges may be sharp or pointed. The gripping arrangement may include one or more wicker teeth.

The slip ring 17 is of suitable dimensions so that, in its fully "relaxed" state (i.e. with no significant external forces acting on the slip ring 17), the narrower end of the slip ring 17 may fit into the open end of the guidance protrusion 7.

If the slip ring 17 is pushed further into the guidance protrusion 7, the tapered outer wall 19 of the slip ring 17 engages with the tapered inner configuration of the guidance protrusion 7, and the slip ring 17 is radially compressed. The result of this will be that the gap 18 in the slip ring is narrowed, so the overall diameter of the slip ring 17 decreases.

The first sealing device 1 further includes a sealing ring 21. The sealing ring 21 is, in the example, generally cylindrical in configuration, and has a diameter which is similar to, or the same as, the diameter of the slip ring 17 when in its relaxed state. In other embodiments, the sealing ring 21 may have a different shape, and may for instance have a generally circular cross-section, taking the form of an O-ring. In the embodiment shown, the sealing ring 21 is of a suitable size to fit snugly into the open end of the retaining cylinder 3 of the upper flange 2.

The sealing ring 21 is made of a resilient material, such as VITON, HNBR or Aflas, although any other suitable material may be used, for instance metallic materials. Where the sealing ring is expected to be exposed to very high pressures, it may be necessary to form the sealing ring primarily from one material, and to have regions or inserts of harder material included through the cross-section. Alternatively, or in addition, the sealing ring may comprise two or more axially stacked rings formed from different materials.

The first sealing device 1 further comprises a pair of anti-extrusion rings 22. Each of these anti-extrusion rings 22 is formed from a resilient material such as steel, and has a diameter which is the same, or substantially the same, as the diameter of the sealing ring 21.

The anti-extrusion rings 22 help to control the direction in which the seal element 21 expands, and help to support the seal element 21 when it is compressed (as will be explained more fully below). In the examples shown in the drawings, the anti-extrusion 22 rings are generally annular, although it is envisaged that they may wrap around the upper and/or lower ends of the sealing ring 21.

To assemble the first sealing device 1, the slip ring 17 is placed between the upper and lower flanges 2, 5, with the narrower end of the tapered configuration of the slip ring 17 pointing towards the lower flange 5.

The sealing ring 21, with one of the anti-extrusion rings 22 on either side thereof, is placed between the slip ring 17 and the upper flange 2. This ordering of components is shown in FIGS. 1 and 2.

The lower flange 5 is then attached to the upper flange 2 using the fastening bolts 14, as described above. It will therefore be understood that the sealing ring 21 and the two anti-extrusion rings 22 are contained within the retaining cylinder 3 of the upper flange 2. The slip ring 17 will be partly received within the guide protrusion 7 of the lower flange 5. However, as explained above, the guide protrusion 7 will itself be received within the open end of the retaining cylinder protrusion 3 of the upper flange 2. The slip ring 17 will therefore ultimately also be fully or substantially wholly contained within the retaining cylinder 3.

Figure 3:
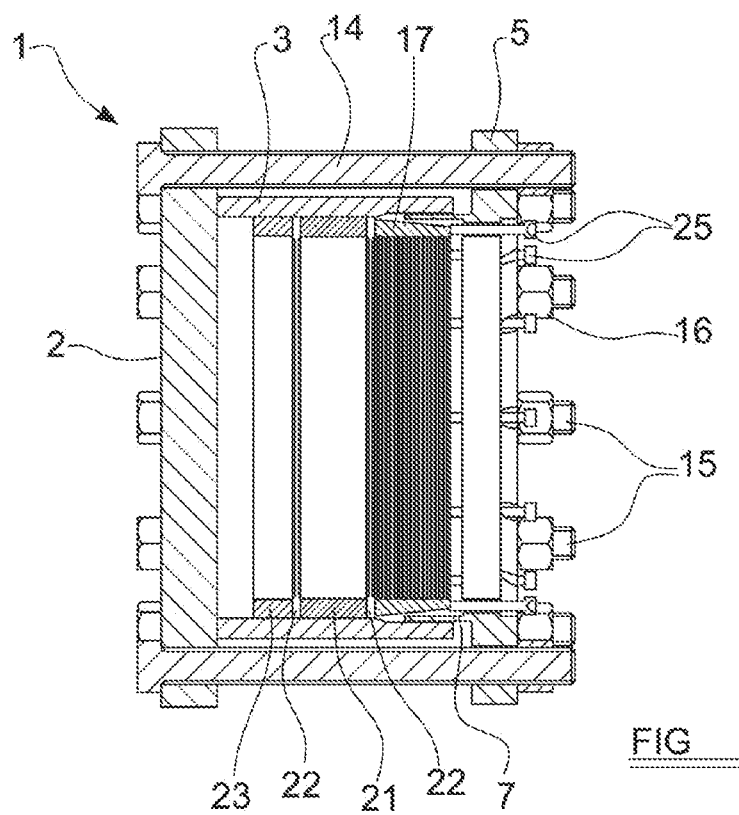
FIGS. 3 to 6 show the first sealing device when assembled.
Figure 4:
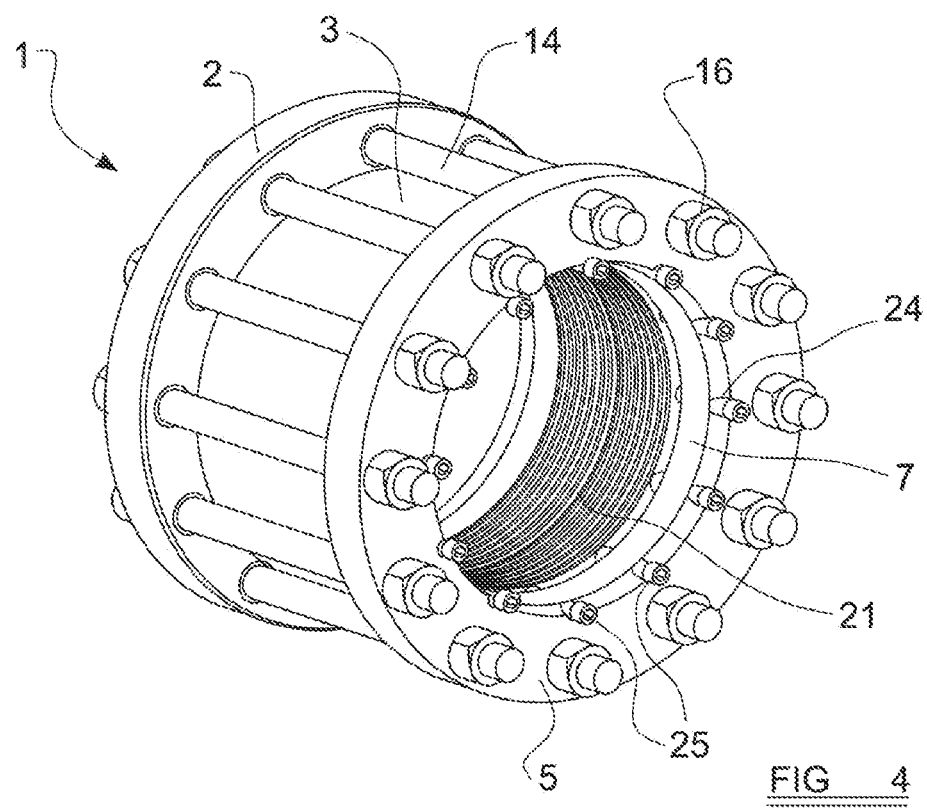

This assembled configuration is shown in FIGS. 3 and 4.

In FIG. 3, which is a cut-away view, a load ring 23 can be seen within the retaining cylinder 3 of the upper flange 2. The load ring 23 takes the form of a robust ring which fits inside the retaining cylinder 3. This load ring 23 is inserted into the retaining cylinder 3 before the other components discussed above, and hence lies at or near the closed end of the retaining cylinder 3, adjacent or near to the upper flange 2. Alternatively, the load ring 23 may be formed integrally as part of the internal wall of the retaining cylinder 3.

One face of the load ring 23 provides a surface on which the other components may land and be firmly seated. It will be understood that one of the anti-extrusion rings 22 is directly in contact with the load ring 23.

As can also be seen in FIGS. 3 and 4, a series of radially spaced-apart apertures 24 are provided on the bottom flange 5, immediately around the central aperture 6 thereof. These apertures are threaded.

A series of jacking screws 25 are threaded into the apertures 24, and the jacking screws 25 are long enough to pass all the way through the bottom flange 5 and press against an end surface of the slip ring 17.

The jacking screws 25 are of sufficient length that, if the jacking screws 25 are fully threaded into the apertures 24, the jacking screws 25 will push the slip ring 17 away from the bottom flange 5, so that the slip ring 17 is at least partially pushed out of the guide protrusion 7. Alternatively, if the jacking screws 25 are rotated so that they protrude through the bottom flange 5 by a lesser amount, the jacking screws 25 will allow the slip ring 17 to be more fully inserted into the guide protrusion 7.

A skilled reader will understand that, by varying the amount by which the jacking screws 25 are threaded into the bottom flange 5, the distance by which the slip ring 17 may be inserted into the guide protrusion 7 of the bottom flange 5 may be controlled.

A method using the first sealing device 1 will now be described.

Firstly, the first sealing device 1 is assembled as discussed above. The nuts 16 that are threaded on to the free ends 15 of the fastening bolts 14 are threaded on to the fastening bolts 14 only relatively loosely. The jacking screws 25 are preferably fully threaded into the apertures 24 in the lower flange 5.

The first sealing device 1 is then placed over the free end of a casing, so that the free end passes through the central aperture 6 of the bottom flange 5, and into the interior of the retaining cylinder 3.

The dimensions of the slip ring 17 are preferably such that, when the slip ring 17 is in its relaxed state, its internal diameter is approximately the same as, or slightly smaller than, the external diameter of the casing. There will therefore be a degree of friction to overcome, between the slip ring 17 and the exterior of the casing, as the first sealing device 1 is placed over the free end of the casing, and the casing passes through the slip ring 17.

At this stage, it is preferred that the casing is not inserted all the way into the interior of the retaining cylinder 3. A gap should be left, in the direction of the longitudinal axis of the casing, between the free end of the casing and the interior of the retaining cylinder 3 (in this case, the interior surface of the upper flange 2). What is important is that the casing is left with room to move, relative to the retaining cylinder 3, in the direction towards the closed end of the retaining cylinder 3. As discussed above, a load ring 23 is placed within the retaining cylinder 3. In some embodiments the load ring 23 may be wide enough that the free end of the casing will land on the load ring 23 if the casing is pushed all the way into the retaining cylinder 3. In this case, the casing should be inserted into the retaining cylinder 3 so that a gap is left between the free end of the casing and the load ring 23. Overall, the casing should be inserted in such a way that there is a gap between the free end of the casing and whichever feature or obstruction the free end of the casing would meet if fully inserted into the retaining cylinder 3. The reason for this will be discussed in more detail below.

The nuts 16 are then tightened on to the fastening bolts 14. This will cause the components held between the upper and lower flanges 2, 5 to be placed under compression, and in particular the sealing ring 21, which is formed of a resilient material, is compressed. As the sealing ring 21 is compressed, it will bulge inwardly towards the exterior of the casing, thus forming a firm seal around the exterior of the casing. This seal will be very useful if pressurised fluid enters the interior of the device 1, as the fluid will be maintained within the device 1 by the seal formed by the sealing ring 21.

The jacking screws 25 are then released, i.e. un-threaded, so that they protrude by a lesser amount into the lower flange 5. This will allow the sealing ring 21 to expand, thus pushing the slip ring 17 further into the guide protrusion 7. The skilled reader will understand that, as this occurs, the tapering surfaces of the slip ring 17 and guide protrusion 7 will interact to cause the slip ring 17 to contract.

Preferably, the procedure of tightening the nut 16 on the fastening bolts 14, and loosening the jacking screws 25, is repeated. At each stage, this will allow the sealing ring 21 to be placed under compression (as the fastening bolts 14 are tightened), and subsequently expand and drive the slip ring 17 further into the guide aperture 7 (as the jacking screws are released).

Figure 5:
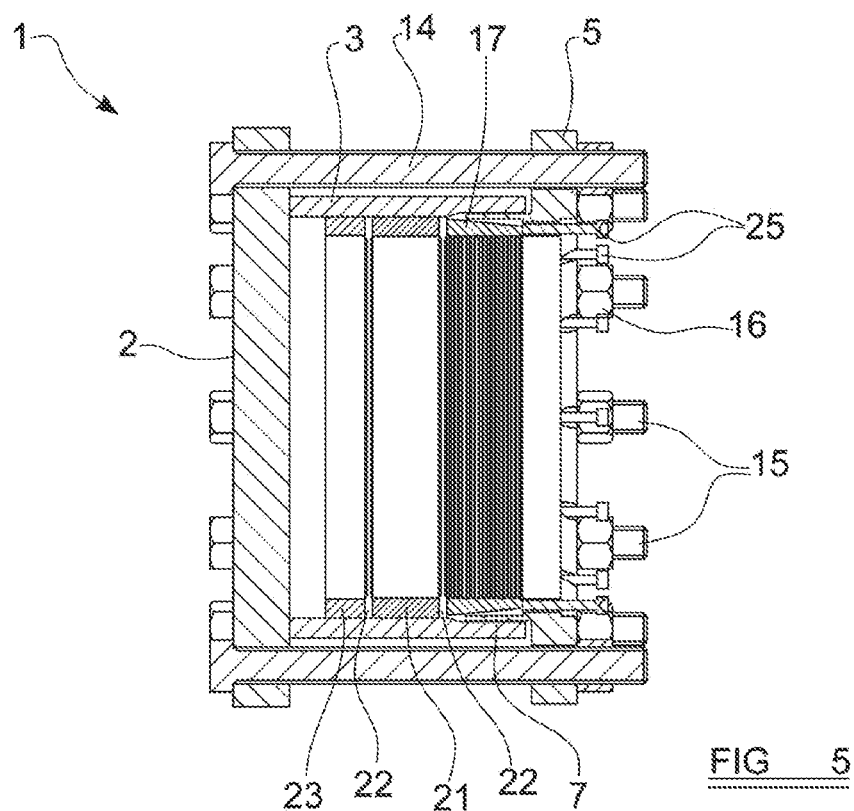

After repeating this procedure one or more times, the jacking screws 25 are fully withdrawn (in that they do not or substantially do not protrude from the inner surface of the lower flange 5). The slip ring 17 has been driven into the guide aperture 7 so that its diameter has reduced, through the gap 18 in the slip ring having closed partly. This situation is shown in FIG. 5. It can be seen in FIG. 5 that, compared to the situation in FIG. 3, the slip ring 17 has been driven further inwardly with respect to the guide protrusion 7.

It will be understood that, as the slip ring 17 reduces in diameter, the grip arrangement formed on its inner surface 20 will grip more firmly against the outer surface of the casing. In preferred embodiments, as discussed, the grip arrangement is formed from a series of spaced-apart ridges or ribs, and it is envisaged that these will bite into the outer surface of the casing, thus gripping the casing very firmly.

It will also be understood that the co-operating tapered surfaces of the slip ring 17 and guide protrusion 7 allow the diameter of the slip ring 17 to be reduced in successive stages using the fastening bolts 14 and jacking screws 25, in such a way that very large inwardly-directed forces can be exerted by the slip ring 17.

The compression of the resilient sealing ring 21 also allows a firm and reliable seal to be formed, sealing the internal space within the retaining cylinder 3. In the discussion above, the compression of the sealing ring 21 is used to drive the slip ring 17 into the guide protrusion 7. However, it should be understood that this is not essential, and the relative motion of the slip ring and guide protrusion 7 may be driven by the tightening of the fastening bolts 14, without the sealing ring 21 being involved in this motion.

As the skilled reader will understand, during this process, the slip ring 17 and the upper flange 2 will move closer together. Since the casing is gripped by the slip ring 17, the result will be that the casing and the upper flange 2 will move closer together.

As discussed above, the casing is preferably initially installed so that a gap is left, allowing the free end of the casing to move towards the closed end of the retaining cylinder 3. It will now be apparent why this is desirable. If the casing is initially fully inserted into the retaining cylinder 3, e.g. so that the free end of the casing is resting against the inner surface of the upper flange 2, then it is likely to be impossible to activate the slip ring 17 in the manner described above. The fact that the casing is resting against the inner surface of the upper flange 2 will prevent the necessary movement of the slip ring 17 and the upper flange 2 towards each other. As an alternative, the slip ring 17 and the upper flange 2 may move towards each other, with the result that the casing is distorted or damaged in the process.

The size of the gap that should be left will depend on the specific configuration of the sealing device 1, and the materials used. As will be understood from the discussion above, the minimum axial gap needs to be at least the same as the seal compression/expansion process requires, and this will be determined by the volume of material available to expand where there is sufficient height or annular length of the seal for this purpose. During use of the device, the sealing ring is compressed and expands outwardly. While the total volume of material of the sealing ring does not change, the axial length of the sealing ring will reduce. The radial gap between the (uncompressed) sealing ring and the interior of the retaining cylinder 3 will dictate the extent to which the sealing ring may be compressed, and thus the extent to which the axial length of the sealing ring may change. In any event, however, the gap between the free end of the casing and the closed inner end of the retaining cylinder 3 should be sufficient to allow the full compression of the retaining ring to take place, without there being any contact between the free end of the casing and the inner end of the retaining cylinder.

However, it is expected that the gap will need to be at least around 2 cm (0.75 inches). In other applications the gap may be larger or smaller than this. However, it is expected that the gap will have a minimum size of around 1 cm (0.4 inches).

In other embodiments, the change in axial length of the retaining ring may be calculated, and the gap may be set to be at least this change in axial length plus a set additional distance. The set additional distance may be, for example, at least around 2 cm (0.75 inches), or may be at least around 1 cm (0.4 inches).

Various techniques are possible for ensuring that an appropriate gap is left when the casing is initially inserted into the retaining cylinder. One approach is to place a cup-like insert into the free end of the casing, where an outwardly-protruding lip of the cup rests on the rim of the free end of the casing. The body of the insert lies within the casing, with the open end of the cup facing towards the closed end of the retaining cylinder 3 (i.e. towards the inner surface of the upper flange). A compression spring is then placed within the cup, with the spring having a length which is longer than that of the cup, so that the spring protrudes outwardly from the mouth of the cup, beyond the free end of the casing.

Figure 19:
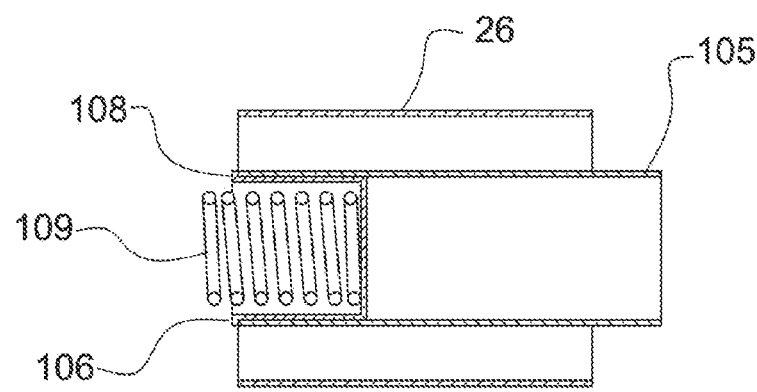

With reference to FIG. 19, a similar arrangement is shown, with a cup 107 being placed into the free end of an inner casing 105, and a spring 109 being placed within the cup 107. However, in this example there is a single casing (rather than an inner casing and an outer casing), with the cup being placed in the free end of this casing.

The spring is of sufficient length, and with a sufficiently high spring constant (i.e. sufficiently low modulus of elasticity), that upon insertion of the casing into the retaining cylinder 3, the spring will press against the inner surface of the upper flange 2 (or another component, as appropriate) and ensure that a suitable gap remains between the free end of the casing and the inner surface of the upper flange 2.

During activation of the slip ring 17, the spring will be further compressed to allow the casing and the upper flange 2 to move towards one another. In general, during initial insertion of the casing, a first level of force may be expected to be exerted to insert the casing into the retaining cylinder 3, and this first level of force may, for example, correspond generally to the weight of the sealing device as it is lowered onto the casing. During activation of the slip ring 17, the casing and the retaining cylinder will be driven towards each other with a higher level of force, sufficient to cause further compression of the spring.

Instead of using the cup and spring, as described above, a compressible ring or annulus, or one or more other suitable compressible elements, may be provided as a landing surface for the free end of the casing. Once the free end of the casing has landed on the compressible element(s), the element(s) may be compressed to form a suitable gap to allow for movement of the casing relative to the retaining cylinder 3. The element(s) may, for example, be hydraulic, and be in communication with a source of pressurised fluid, preferably an independent source of pressurised fluid, for instance via the annulus. The pressurised fluid could be delivered through a valve or other regulator to a suitable connection on a side surface of the device 1, and the skilled reader will readily understand how this may be achieved. The element(s) could be activated, for example, by expanding a circular jacking ring, or by fluid pressure inflation. In preferred embodiments, the element(s) can be activated independently of the activation of the slip ring 17.

As an alternative, the casing can be inserted into the sealing device 1 in such a way that a gap is left, without any physical feature being in place for this purpose. For instance, the allowable distance which the casing can be inserted into the sealing device 1 can be measured, and markings can be made on the exterior of the casing at this distance from the free end of the casing (preferably plus an allowance or margin for error). The insertion process can then be visually monitored (or monitored by way of a suitable machine/computer), using the markings, to make sure that the casing is not inserted too far into the sealing device 1.

More simply, the casing may be fully inserted into the sealing device 1, and then removed by a suitable distance before the slip ring 17 is activated. The sealing device 1 may, for example, be suspended from above by one or more support cables, and following initial full insertion of the casing into the sealing device 1, the sealing device 1 may be lifted upwardly by a suitable distance prior to activation of the slip ring.

The sequence of installation steps described above may, in certain circumstances, lead to excessive inwardly-directed forces acting on the casing. This may cause the casing to become damaged, or even to collapse inwardly.

As an alternative to the sequence of steps discussed above, the following alternative sequence of installation steps may alternatively be used. Firstly, the first sealing device 1 is placed over the end of the casing 26, without the jacking screws 25 being inserted at all (or at least not being present in any way that interferes significantly with movement of components of the first sealing device 1).

The fastening bolts 14 are then tightened. Initially, this will cause the sealing ring 21 to be compressed, and the slip ring 17 to be driven onto the tapered surface of the guide protrusion 7. This will cause the slip ring 17 to contract, as discussed above, biting into the external surface of the casing 26.

As the fastening bolts are further fastened, a point will be reached at which the slip ring 17 is axially locked in place with respect to the guide protrusion 7. This is not because any component axially contacts the slip ring 17 and prevents further movement, but because it is tightly wedged against the guide protrusion 7 such that no further axial movement will occur. At this point, further tightening of the fastening bolts 14 will compress the sealing ring 21, and cause the top flange 2 to move downwardly with respect to the casing 26.

As this occurs, further tightening of the fastening bolts 14 is halted. The jacking screws 25 are then inserted until they abut the lower surface of the slip ring 17. The jacking screws 25 then provide a barrier to further downward movement of the slip ring 17 with respect to the guide protrusion 7. It will be understood that this effectively means that the slip ring 17 cannot contract any further—to do so would be the result of the slip ring 17 being pushed further downwardly with respect to the guide protrusion 7, and this movement is blocked by the presence of the jacking screws 25.

Once the jacking screws 25 have been inserted in this manner, further tightening of the fastening bolts 14 can be carried out to cause further compression of the sealing ring 21, thus firmly sealing the sealing ring 21 against the exterior of the casing 26, without this risking the generation of excessive radial inward forces through the slip ring 17 which may cause the casing 26 to collapse.

Figure 6:
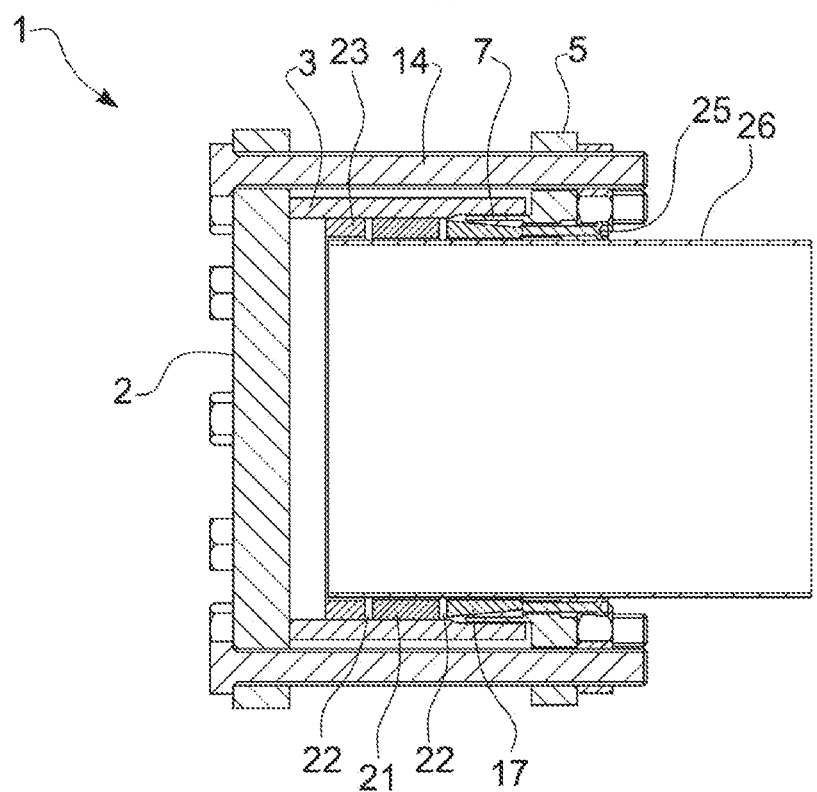

FIG. 6 shows the first sealing device 1 in position around a casing 26.

In order to remove the first sealing device 1 from the casing, the procedure above is effectively reversed. Firstly, the fastening bolts 14 are loosened, to reduce the compressive forces acting on the sealing ring 21. The jacking screws 25 are then tightened, to lift the slip ring 17 out of the guide protrusion 7, thus allowing its diameter to increase. Once this has been done, the fastening bolts 14 are again loosened, and the jacking screws 25 are tightened. This procedure is released until the slip ring 17 has increased sufficiently in diameter to allow the first sealing device 1 to be removed from the free end of the casing 26.

In addition, it is envisaged that a further set of removal nuts (not shown) may be threaded onto the fastening bolts 41, located between the upper and lower flanges 2, 5. During the course of removing the first sealing device from the casing 26, these removal nuts may be rotated so that they press against the upper side of the lower flange 5, thus actively driving the lower flange 5 downwardly away from the upper flange 2. This will have the effect of separating the guide protrusion 7 from the slip ring 17, thus allowing the slip ring 17 to expand.

Figure 7:
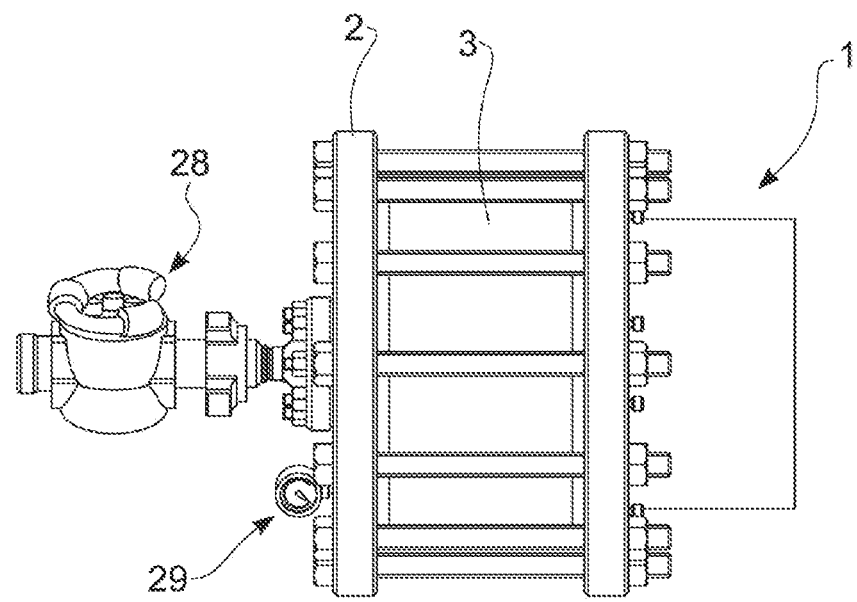
FIGS. 7 and 8 show a variation on the first sealing device.
Figure 8:
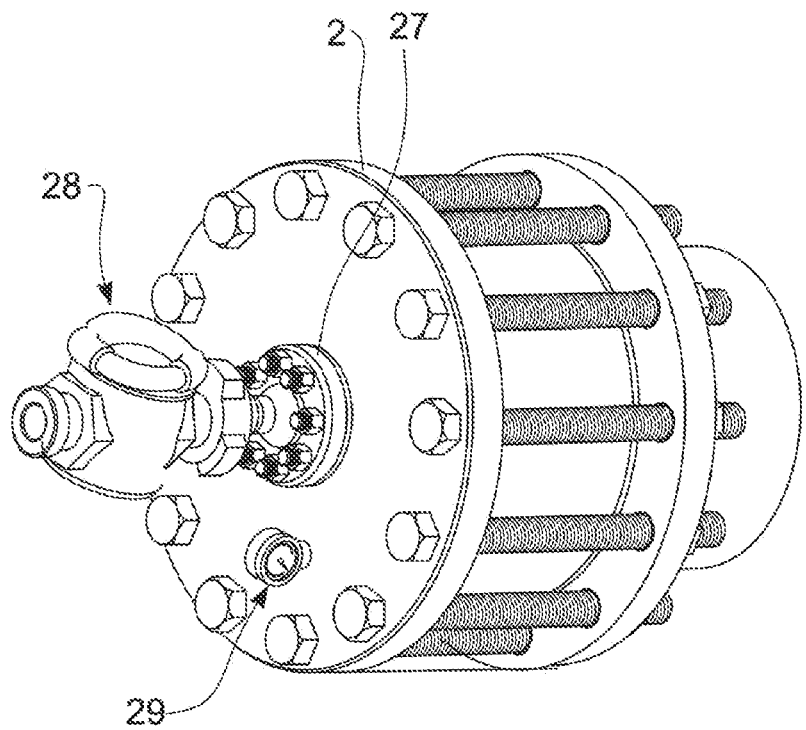

FIGS. 7 and 8 show a variation on the first sealing device 1. In these embodiments, the upper flange 2 has a central aperture 27 formed therethrough, with a regulator 28 fitted to the aperture 27.

In addition, a pressure gauge 29 protrudes from the top flange 2, and provides an indication of the pressure within the first sealing device 1.

The regulator 28 may be used to inject a fluid, such as cement, into the interior of the retaining cylinder 3. The skilled reader will appreciate how this may be achieved. In preferred embodiments, a pressure sensor will protrude through an aperture in the upper flange 2 into the interior of the retaining cylinder 3.

The alternative embodiments shown in FIGS. 7 and 8 will allow injectivity tests to determine where the fluid leaks through the casing into the surrounding formation. Fluid may leak in this way if the cement seal around the casing is incomplete or has been damaged. If it is determined that fluid does leak through the casing and into the formation, cement can be introduced into the interior of the casing through the regulator 28, so that the cement can be pumped and squeezed into the formation at the location of the leak, thus reducing or preventing leakage at this location.

In embodiments of the invention, a retaining arrangement may be provided to hold the slip ring 17 in a relatively open position, to assist in allowing the first sealing device 1 to be installed on, and removed from, the casing 26. For instance, one or more radial screws (not shown) may be provided, which are inserted into corresponding radial holes (not shown) formed in the retaining cylinder 3 at appropriate locations. The slip ring 17 has a series of corresponding threaded apertures in its outer surface. Prior to installation of the first sealing device 1 on a casing, the radial screws are threaded into the apertures on the slip ring 17, and used to hold the slip ring 17 in a relatively open position, so that the casing can easily pass the slip ring 17. When the first sealing device 1 has been fully installed around a casing 26, the radial screws may be removed, allowing the slip ring 17 to contract around the casing. Similarly, when the first sealing device 17 is to be removed from a casing, radial screws may be threaded into the apertures on the slip ring and used to expand the slip ring 17, this allowing the casing to be withdrawn from the first sealing device 1. A similar technique may be used, where applicable, with any of the other embodiments discussed herein.

The pressure within the first sealing device 1 may, in use, become very high. This may be due to well bore pressure in the event of a leak, or through pressure applied when pumping fluid or cement into the first sealing device 1. In the event of high pressure of this kind, the pressure may act against the upper end of the upper anti-extrusion ring, and in turn exert a force on the slip ring 17, tending to drive the slip ring 17 further into the guide protrusion 7. This would cause the slip ring 17 to contract further around the casing 26, and may damage or collapse the casing.

To assist in counteracting this, once the first sealing device 1 has been fully installed around a casing 26, the jacking screws 25 are advanced through the corresponding apertures 24 until they touch the lower side of the slip ring 17. The presence of these jacking screws 25 will therefore prevent the slip ring 17 from being driven too far into the guide protrusion 7. Indeed, rather than withdrawing and then advancing the jacking screws 25, during installation the jacking screws 25 may simply be left touching (or lying close to) the lower side of the slip ring 17, for this purpose.

Depending on the circumstances under which it is used, the inward forces exerted on the exterior of the casing 26 by the slip ring 17 may be sufficient to damage or collapse the casing 26. To avoid this, the overall contact area with the casing 26 may be increased, so that the forces exerted on the casing 26 are spread over a larger area. This could be achieved by adding one or more further slip rings, and also one or more further corresponding tapered guide surfaces, which for instance could be axially spaced apart from one another in the guide protrusion 7. The slip rings could be linked together, or arranged to bear against each other in use, so that all of the slip rings are contracted by corresponding tapered guide surfaces as the device is installed around a casing. The skilled reader will understand how this may be achieved.

A further possibility would be to include a helical slip arrangement, which extends around the casing for several turns, and has a gripping arrangement formed on its inner surface. It is envisaged that a suitable tapering helical guide surface would be provided on the inside of the guide protrusion, to cause the helical slip arrangement to contract around the casing.

Another example would be to use a slip arrangement which resembles a basket grapple, as those skilled in the art will understand. In such embodiments, a slip element may be provided which has a generally cylindrical inner surface, with a grip arrangement formed thereon to engage with and grip onto the exterior of the casing (comprising rings or ribs, for example, as discussed above). The outer surface of the slip element has two or more turns of a helical track formed thereon, with the face of the track at any point being tapered, so that it is wider towards the top end of the slip element and narrower towards the bottom end of the slip element.

Instead of the substantially symmetrical taper of the guide protrusion 7 disclosed above, an alternative guide protrusion may be formed, which has an inner surface having two or more turns of a helical track formed therein, generally matching the exterior configuration of the slip element. It will be understood that, if the slip element and guide protrusion are driven axially with respect to each other, the slip element will be deflected radially inwardly along its length, as the turns of the helical track of the guide protrusion interact with the turns of the helical track of the slip element.

The slip element may have one or more circumferential breaks, to allow the slip element to expand and contract. In preferred embodiments, each circumferential break extends over some, but not all, of the length of the slip element. Alternatively, or in addition, one complete circumferential break may be provided along the entire length of the slip element.

A slip element of this kind may be significantly longer (axially) than the slip ring 17 discussed above in relation to the first sealing device 1. The skilled reader will appreciate that a slip element of this kind will allow a greater area of contact with the exterior of the casing, thus reducing the pressure at any one point of contact.

As a variation on the slip ring 17 described above, it is envisaged that a plurality of balls, or similar elements, formed from steel or another robust material, may be placed between the lower anti-extrusion ring 22 and the guide protrusion 7. As the upper and lower flanges 2, 5 are drawn together by the fastening bolts 14, the ball bearings will be pushed into the guide protrusion 7, and then driven axially inwardly to engage with, and bite into, the outer surface of the casing 26 by the inclined inner face of the guide protrusion 7. The skilled person will appreciate that any other suitable engagement arrangement may be used, where the engagement arrangement may be driven into the guide protrusion 7, and deflected axially inwardly by the inner face of the guide protrusion 7 to engage the outer surface of the casing 26.

Figure 9:
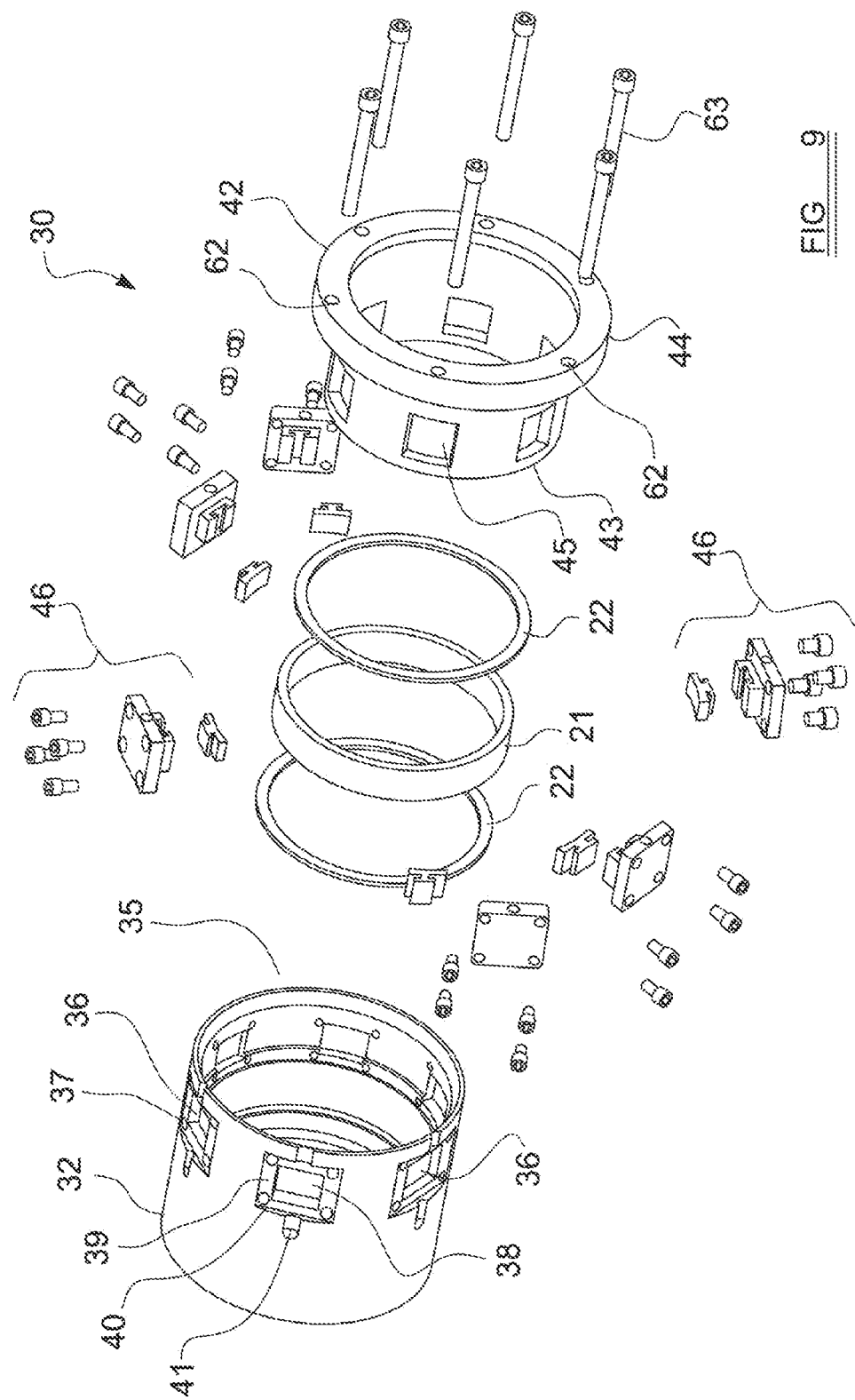
FIG. 9 shows components of a second sealing device embodying the present invention, in exploded view.
Figure 10:
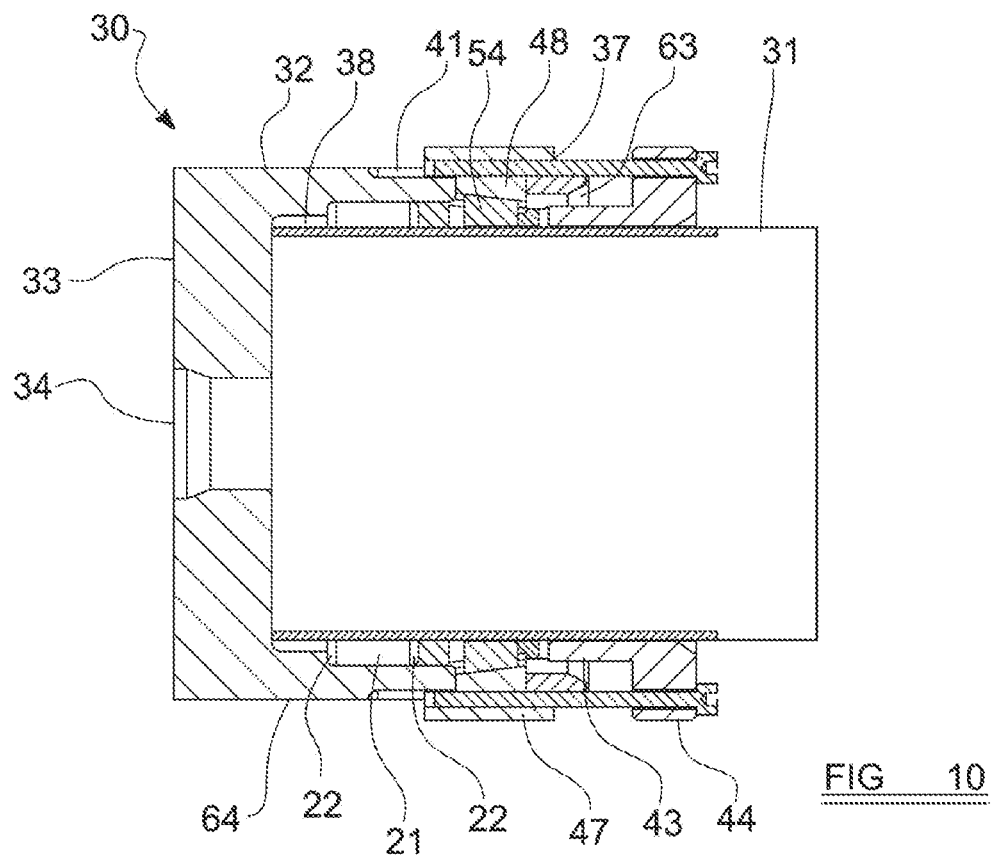
FIG. 10 shows the second sealing device when assembled.

FIGS. 9 and 10 show components of a second sealing device 30 embodying the present invention. In FIG. 9 the components are shown in an exploded view, and in FIG. 10 the components are shown in an assembled configuration around a casing 31.

The second sealing device 30 comprises atop cylinder 32, with dimensions generally comparable to those of the retaining cylinder 3 described above. The top cylinder 32 is not, in this example, however, attached to a top flange. A top end 33 of the top cylinder 32 is substantially closed, aside from an access aperture 34 provided in the centre thereof. The bottom end 35 of the top cylinder 33 is open.

Arranged around the circumference of the top cylinder 32 are a number of slip attachment sites 36. In the example shown, six slip attachment sides 36 are shown. Each attachment site 36 comprises an aperture 37 formed through the sidewall of the top cylinder 32, allowing access to the interior thereof through the sidewall 38. In the example shown each aperture 37 is generally rectangular in shape.

Surrounding each aperture 37 is a flattened attachment region 39. In this example, a number of attachment holes 40 are provided in the attachment region 39. The attachment holes 40 are preferably threaded and are blind holes, i.e. they do not pass all of the way through the sidewall 38 of the top cylinder 32.

In addition, an elongate guide groove 41 is formed in the sidewall 38 of the top cylinder 32, associated with each slip attachment site 36. Each guide groove 41 is preferably parallel with the central axis of the top cylinder 32, and extends from the lower end 35 of the top cylinder 32 in a direction towards the top end 33 thereof. Each guide groove 41 preferably passes through each of the slip attachment sites 36. In the example shown, each guide groove 41 has a first portion which is located between the lower end 35 of the top cylinder 2 and the slip attachment site 36, and a second portion, aligned with the first portion, which extends from the slip attachment site 36 partway towards the top end 33 of the top cylinder 32.

In the example shown, each guide groove 41 is generally semi-circular in cross-section, and is open at the outer wall 38 of the top cylinder 32. In effect, each guide groove 41 forms an elongate trough.

The second sealing device 30 further comprises a bottom body 42. The bottom body 42 comprises a bottom cylinder 43, which is dimension to fit closely inside the open bottom end 35 of the top cylinder 32. At its lower end, the bottom cylinder 43 is connected to a lower flange 44, which has an outer diameter which is greater than that at the bottom cylinder 43. The bottom cylinder 43 and lower flange 44 are preferably integrally formed, but may be formed separately and connected to one another, for instance by welding.

The bottom cylinder 43 has a number of slip apertures 45 formed therethrough at radially spaced-apart positions. The slip apertures 45 are positioned such that, when the bottom cylinder 43 is inserted into the open lower end 35 of the top cylinder 32, the slip apertures 45 formed therein will align with the apertures 37 that form part of the respective slip attachment sites 36 of the top cylinder 32.

The slip apertures 45 of the lower cylinder 43 are longer, in the axial direction, than the apertures 37 of the slip attachment sites 36 of the top cylinder 32.

Figure 11:
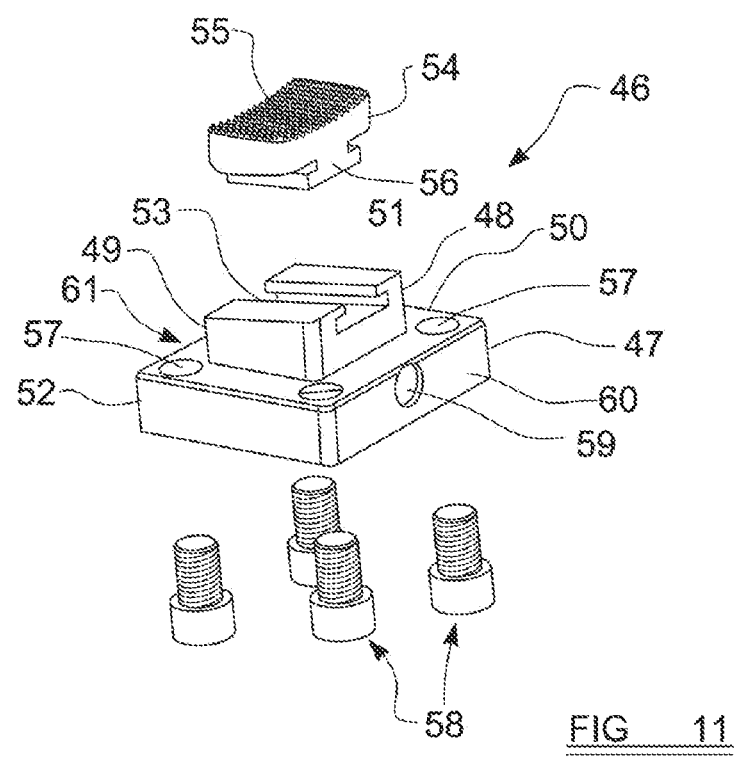
FIG. 11 shows a close-up view of a slip assembly of the second sealing device.

The second sealing device 30 further comprises a number (in this example, six) of slip assemblies 46. One slip assembly 46 is shown in greater detail in FIG. 11. Each slip assembly comprises a support block 47, which is generally oblong and in the example shown takes the form of a generally square plinth. The support block 47 has a protrusion 48 extending from one its major surfaces. The protrusion 48 is generally rectangular in its external profile, and is tapered, in that it extends from the support block 47 by a lesser amount at a first end 49 than at an opposite second end 50. The protrusion 48 therefore has a guide face 51 which is inclined with respect to the surface 52 of the support block 47 from which it protrudes.

The protrusion further has a guide slot 53 formed therein. The guide slot 53 is generally T-shaped, and is open on the guide surface 51 of the protrusion 48. The guide slot 53 passes continually from the first end 49 to the second end 50 of the protrusion 48, and is preferably open at both ends.

The slip assembly 46 further comprises a slip element 54, comprising a generally oblong body having a grip face 55. The grip face 55 is provided with a grip arrangement, which in this example comprises an array of spike elements, arranged in a generally rectangular grid. Any other suitable grip arrangement may be used, however, such as parallel ribs or ridges, or an array of button-type protrusions. The features on the grip face may (in this and other embodiments) be formed from tungsten carbide, for example. In use, as will be described more fully below, the grip surface 55 will come into contact with the outer surface of the casing 31. The grip face 55 is, therefore, preferably curved to match the external curvature of the casing 31. Preferably, for all embodiments disclosed herein, a grip face which extends for at least 3 cm both axially and circumferentially has a curvature which matches the external curvature of the casing 31.

The slip element 54 has, on the side furthest from the grip face 55, a T-shaped protrusion 56, which is of a suitable shape and size fit into, and travel along, the guide slot 53 formed in the protrusion 48 of the support block 47. The T-shaped protrusion 56 is angled with respect to the grip face 55, at an angle which matches the angle of taper of the guide surface 51 of the protrusion 48. The skilled reader will therefore understand that as the T-shaped protrusion 56 travels along the guide slot 53, the grip face 55 will remain parallel or substantially parallel with the surface 52 of the support block 47 from which the protrusion 48 extends.

The skilled reader will also understand that, as the T-shaped protrusion of the slip element travels 54 along the guide slot 53, the distance of the grip face 55 from the support block 47 will decrease (as the slip element 54 moves further towards the first end 49 of the protrusion 48) or increase (as the slip element 54 moves towards the second end 50 of the protrusion 48).

The support block 47 has a number of attachment holes 57 formed therethrough, generally at right-angles to the plane of the support block 47. In the example shown, four attachment holes 57 are shown, one at each corner of the support block 47. The attachment holes 57 pass all the way through the depth of the support block 47.

The attachment holes 57 are preferably threaded.

The slip assembly 46 further comprises attachment bolts 58, which are adapted to pass through the attachment holes 57. The bolts 58 are of sufficient length to pass through the attachment holes 57 and protrude from the far side thereof.

Finally, the support block 47 has a connection aperture 59 formed therethrough. The connection aperture 59 passes through the support block 47, parallel or substantially parallel with the plane thereof. The connection aperture 59 is threaded. Preferably, the connection aperture 59 extends from a point which is approximately midway along one end 60 of the support block 47, passes all the way through the support block 47, and protrudes from a point roughly midway along the opposite end 61 thereof.

The connection aperture 59 runs generally parallel with the guide slot 53.

Returning to FIG. 9, the second sealing device 30 further comprises a sealing ring 21 and a pair of anti-extrusion rings 22, which are as described above in relation to the first sealing device 1. The sealing ring 21, and the anti-extrusion rings 22, are sized to fit snugly within the hollow interior of the top cylinder 32.

The flange 44 that extends from the bottom cylinder 43 has a number of radially-spaced apart attachment holes 62 formed therethrough. A series of elongate fasting bolts 63 are provided, which are adapted to pass through respective connection apertures 62.

To assemble the second sealing device 30, the sealing ring 21 and the two anti-extrusion rings 22 are first inserted into the open end of the top cylinder 32. As can be seen in FIG. 10, these components may (as with the first sealing device 1) rest on a load ring 64 which is provided within the top cylinder 32. The load ring 64 may be formed integrally as part of the inner wall of the top cylinder 32, or may be provided as separate component.

The bottom cylinder 43 is then inserted into the top cylinder 32 so that the slip apertures 45 of the bottom cylinder 43 align with the apertures 37 of the slip attachment sites 36 of the top cylinder 32.

Slip assemblies 46 are then attached to each of the slip attachment sites 36. As can be seen in FIG. 9, the slip assemblies 46 are orientated so that the slip element 54 faces inwardly, towards the centre of the hollow interior of the top cylinder 32. The protrusion 48 of each slip assembly will pass through both the aperture 37 in the top cylinder 32, and also the appropriate slip aperture 45 of the bottom cylinder 43.

The part of the support block 47 that surrounds the protrusion 48 will land on the attachment region 39 of each slip attachment site 36. The attachment bolts 58 may then be passed through the apertures 57 formed in the support block 47, and the apertures 40 provided in the attachment region 39 of each slip attachment site 36, to attach the support block 47 firmly to the top cylinder 32.

As mentioned above, the slip apertures 45 formed in the lower cylinder 43 are longer than the apertures 37 that are formed as part of the slip attachment sites 36 of the top cylinder 32. This means that, when the slip assemblies 46 are attached to the top cylinder 32 as discussed above, the bottom cylinder 43 may move axially by a certain amount with respect to the top cylinder 32. In preferred embodiments, the axial distance by which the bottom cylinder 43 may move with respect to the top cylinder 32 is around 5-10 centimetres, although any other suitable relative distance for this movement may be possible.

The fastening bolts 63 are then inserted through the connection apertures 62 formed in the flange 42 attached to the bottom cylinder 43. Each bolt 63 passes along one of the guide grooves 41 formed on the outer surface 38 of the top cylinder 32 and is threaded through the connection aperture 59 of the corresponding support block 47 of one of the slip assemblies 46.

It will therefore be understood that the bottom cylinder 43 is attached to the top cylinder 32 by way of these fastening bolts 63, which firmly attach the bottom cylinder 43 to the slip assemblies 46, which are in turn are firmly attached to the top cylinder 32. The axial position of the bottom cylinder 43 with respect to the top cylinder 32 can be controlled by tightening or loosening the fastening bolts.

As can be seen in FIGS. 9 and 10, the slip assemblies 46 are oriented so that the first end 49 of the protrusion 48 of each support block 47 (i.e. the end at which the protrusion 48 protrudes by a relatively small amount from the support block 47) is positioned closest to the top, closed end 33 of the top cylinder 32. The second end 50 of the protrusion 48 (i.e. the end at which the protrusion 48 extends by a relatively large amount from the support block 47) is positioned furthest from the top end 33 of the top cylinder 32. The skilled reader will therefore understand that, as each slip element 54 slides along the guide slot 53 of the corresponding protrusion 48 towards to the top end 33 of the top cylinder, the slip element 54 will move radially outwardly away from the central axis of the top cylinder 32.

Figure 12:
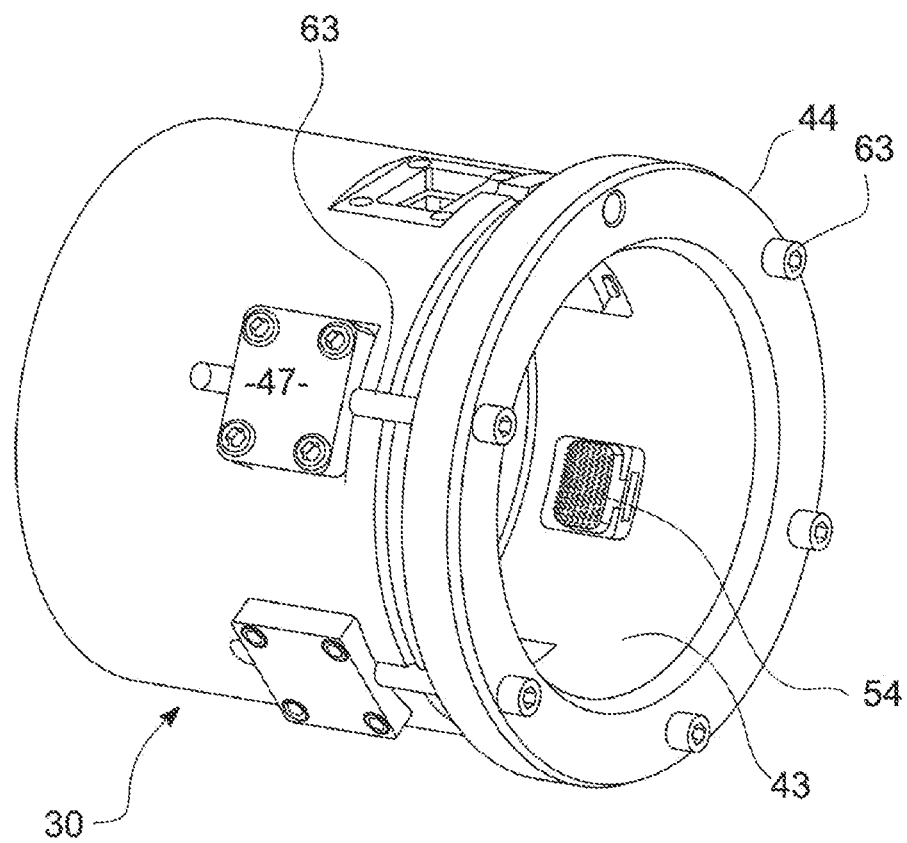
FIG. 12 shows a close-up view of a part of the second sealing device.

FIG. 12 shows a perspective view of the assembled second sealing device 30 showing clearly how the fastening bolts 63 pass through the flange 44 attached to the bottom cylinder 43, and are threaded through the support blocks 47 of the slip assemblies 46. This figure also shows how the slip elements 54 protrude inwardly into the hollow interior of the second sealing device 30.

Use of the second sealing device 30 will now be described.

As mentioned above, the top end 33 of the top cylinder 32 has an aperture 34 formed therethrough. In this embodiment, a regulator (not shown), similar to the regulator shown above in FIGS. 7 and 8, will be attached to the top end 33. In other embodiments, the top end 33 could be continuous and have no aperture formed therethrough, thus completely sealing the top end 33 of the top cylinder 32.

The second sealing device 30 is placed over the free end of a casing 31, so that the casing 31 passes into the interior of the device 30, as shown in FIG. 10. At this point, the fasting bolts 63 are fastened only relatively loosely.

As the casing 31 is inserted into the device 30, the slip elements 54 will be pushed towards the first ends 49 of the guide slots 53 in the respective protrusions 48, and will thus be at their maximum radial distance from the central axis of the top cylinder 32. This will allow the casing 31 to pass readily between the slip elements 54.

In the view shown in FIG. 10, the casing 31 is inserted all the way to the end of the top cylinder 32. However, as discussed above, in practice it is expected that, in the first instance, the casing 31 will be inserted to a distance that leaves a space between the free end of the casing 31 and the end of the top cylinder 32.

The fastening bolts 63 are then tightened, and it will be understood that this will draw the top cylinder 32 and the bottom cylinder 43 towards one another. One effect of this will be to place the sealing element 21 under compression, as it will be squeezed between the load ring 64 within the top cylinder 32 and the leading edge of the bottom cylinder 43. Once again, the compression of the sealing element 21 will provide a firm and reliable seal around the exterior of the casing 31.

At this point in the installation process, it may be necessary to drive the slip elements 54 downwardly, i.e. away from the top end 33 of the top cylinder 32. This will cause the slip elements 54 to travel towards the second ends 50 of the respective protrusions 48, and hence be driven inwardly towards the central axis of the top cylinder 32. The slip elements will therefore be driven to engage with, and bite into, the outer surface of the casing 31.

Figure 13:
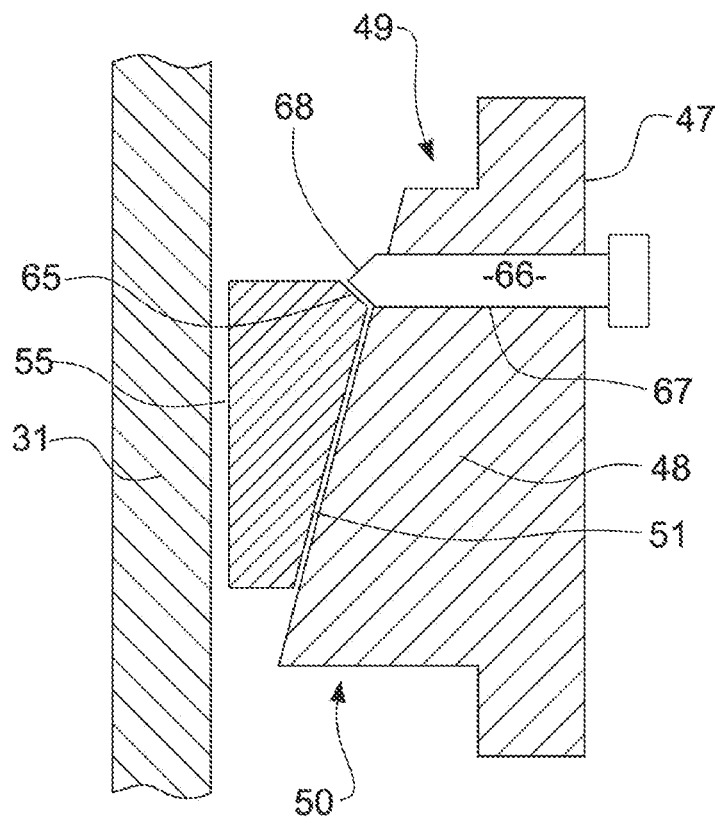
FIG. 13 shows an optional feature of the second sealing device.

In one embodiment, a series of driving screws may be provided, with one (or more) driving screws being provided for each slip element 54. A schematic view of this is shown in FIG. 13, which shows a close-up view of parts of one slip arrangement 46, as well as part of the wall of the casing 31. In this embodiment, the slip element 54 has an angled face 65 formed on the side that is nearest to the first end 49 of the protrusion 48. In preferred embodiments, this angled face 65 is set at an angle of around 45° to the plane of the support block 47.

A driving screw 66 is threaded through a threaded bore 67 that is formed through the support block 47 and the protrusion 48. The bore 67 is radial or substantially radial, and on its inner side exits the guide face 51 of the protrusion 48 near the angled face 65 of the slip element 54. The leading end 68 of the driving screw 66 is generally conical, having an angle which generally matches that of the angled face 65 of the slip element 54.

It will be understood that, if the driving screw 66 is advanced into the support block 47, the leading end 68 of the driving screw 66 will bear against the angled face 65 of the slip element 54, and drive the slip element 54 downwardly, i.e. towards the second end 50 of the protrusion 48. As this occurs, the slip element 54 will be driven further inwardly into contact with the casing 31, as a result of the angle of the guide face 51 of the protrusion 48.

As an alternative to, or in addition to, the driving screws 66, each slip element 54 may be biased (for instance, by a suitable spring) towards the second end 50 of each protrusion 48, i.e. towards its most radially inward position. As the device 30 in installed over the free end of the casing 31, the slip elements 54 will be pushed towards the first ends 49 of the protrusions 48 by this action, but once the casing 31 is within the device 30 the biasing will tend to force the slip elements 54 into engagement with the outer surface of the casing 31.

It is expected that, since the grip faces 55 of the slip elements 54 will be pressed against the outer surface of the casing 31, and the grip arrangement thereof will begin to "bite" into the outer surface of the casing 31, the slip elements 54 will remain stationary with respect to the casing as the fastening bolts 63 are fastened.

Tightening the fastening bolts 63 will therefore have the effect of drawing the top cylinder 32 and bottom cylinder 43 towards each other. At this point it is expected that the effect will be to draw the bottom cylinder 43 upwards towards the top cylinder 32.

It will be understood from the above discussion how the second sealing device 30 may be installed over the free end of an abandoned casing 31, and the slip elements 54 of the second cylinder device 30 may be driven into firm engagement with the outer surface of the casing 31, to hold the second sealing device 30 in place. Moreover, if any of the forces act on the second cylinder device 30 that would tend to lift the second sealing device 30 off the free end of the casing 31, the result of this will be to force the support blocks 47 towards the free end of the casing 31, since the support blocks 47 are firmly attached to the top cylinder 32. Since the slip elements 54 will remain stationary with respect to the casing 31, this will cause the slip elements 54 to travel along the guide slots 53 of the respective protrusions 48 towards the second ends 50 thereof, thus driving the slip elements 54 more firmly into engagement with the outer surface of the casing 31, and helping to prevent the second sealing device 30 from being removed from the casing 31.

Once again, cement or other fluid may be injected into the interior of the casing 31 through the aperture 34 that is formed in the top wall 33 of the top cylinder 32, for instance through a regulator as shown above.

In order to remove the second sealing device 30, the fastening bolts 63 are loosened, and the top cylinder 32 is pushed downwardly away from the end of the casing 31, which will in turn cause the slip elements 54 to move radially outwardly away from the central axis of the casing 31. Ultimately, the second sealing device 30 can be removed from the end of the casing 31.

It is envisaged that the forces that may act axially inwardly, exerted by the slip elements 54, may be sufficient to damage or collapse the casing 31. In order to avoid this, in some embodiments two or more "banks" of slip assemblies 46 may be provided. One bank of slip assemblies 46 may be provided closer to the open end 35 of the top cylinder 32, and a second bank will be located further from this open end 35. It will be understood that each bank of slip arrangement 46 will operate in the same way as the slip arrangements 46 discussed above. However, the overall effect will be that the forces acting on the exterior of the casing 31 can be spread over a larger area, and so the risk of damage to the casing 31 at any point can be reduced.

Figure 16:
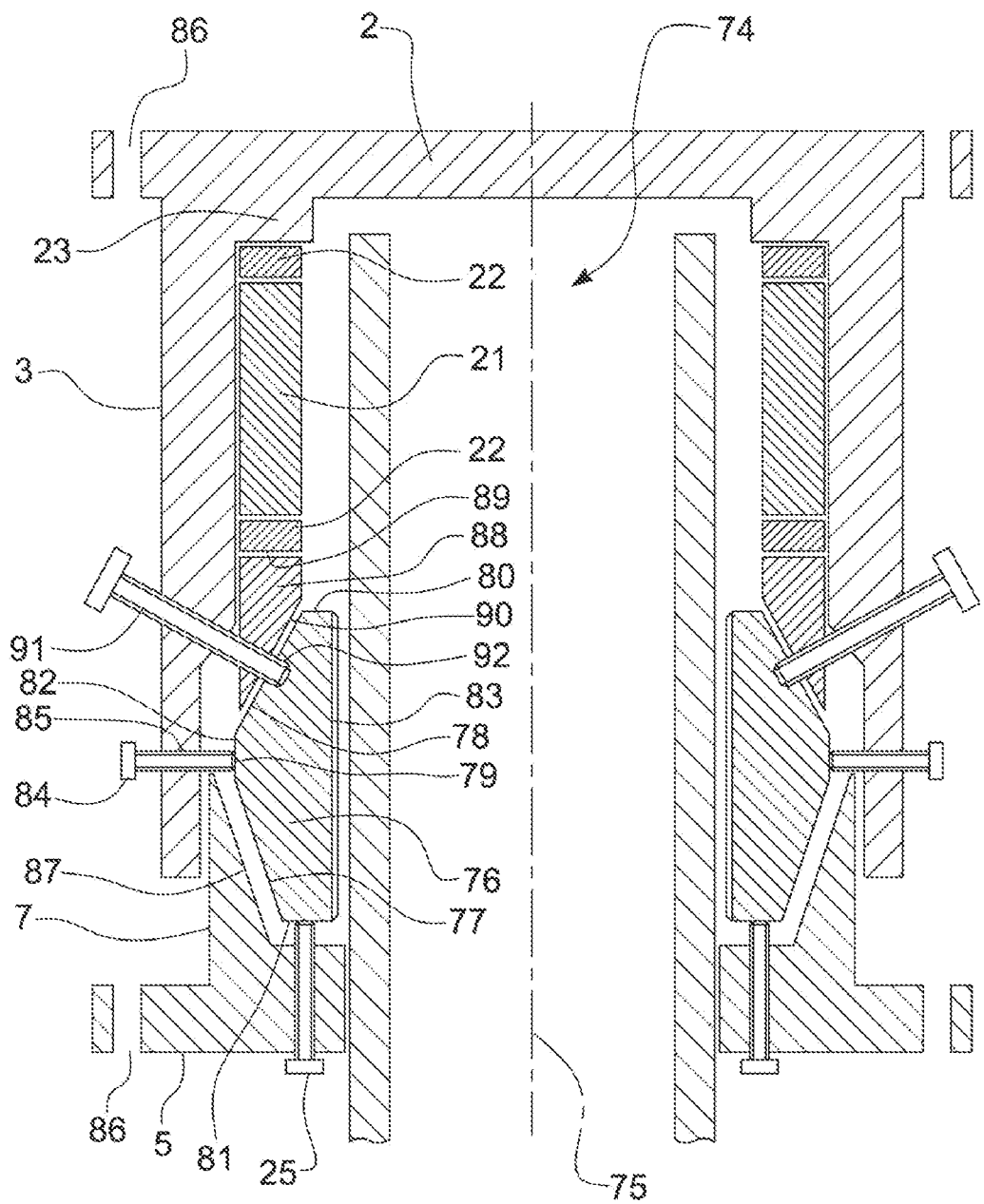
FIG. 16 shows components of a third sealing device embodying the present invention.

FIG. 16 shows a third sealing device 74 embodying the present invention. In FIG. 16, only components on one side of the central axis 75 of the third sealing device 74 are shown.

Many of the components of the third sealing device 74 are common with the first sealing device 1. The third sealing device 74 comprises top and bottom flanges 2, 5. A retaining cylinder 3 protrudes from the top flange 2, and a guide protrusion 7 extends from the bottom flange 5.

A seal element 21, surrounded by two anti-extrusion rings 22, rests on a load ring 23 within the retaining cylinder 3.

In contrast to the first sealing device 1, however, the third sealing device 74 has a slip ring 76 which has an outer profile including upper and lower tapered surfaces 77, 78. These tapered surfaces 77, 78 are arranged so that the slip ring 76 is thickest in a middle region 79, and tapers towards its top and bottom ends 80, 81. Preferably, the slip ring 76 has a flattened outer section 82 in its middle region 79, which is generally parallel with the inner gripping face 83 thereof.

In common with the slip ring 17 of the first sealing device 1, the slip ring 76 of the third sealing device 74 has a break in its circumference, to allow the overall diameter of the slip ring 76 to expand and contract.

The third sealing device 74 has a series of jacking screws 25, as described above, and also one or more radial screws 84 which may be advanced through threaded bores 85 in the retaining cylinder 3 to press against the slip ring 76 (preferably, the flattened region 82 thereof), to hold the slip ring 76 in place.

Elongate fastening bolts or studs may extend between corresponding fastening apertures in the top and bottom flanges 2, 5, although these bolts or studs are not shown in FIG. 16 for the purposes of clarity.

The guide protrusion 7 has a tapering inner guide face 87, and the angle of taper of the guide face 87 generally matches the lower tapering surface 77 of the slip ring 76.

The third sealing device 75 also includes an upper guide ring 88, which is positioned between the lower anti-extrusion ring 22 and the upper tapering face 78 of the slip ring 76. The top surface 89 of the upper guide ring 88 is generally flat and parallel with the lower surface of the lower anti-extrusion ring 22. The bottom surface 90 of the upper guide ring 88 is tapered at an angle that generally matches the upper tapered surface 78 of the slip ring 76.

The slip ring 76 is set against the casing 26 in generally the same manner as is explained above in relation to the first sealing device 1. The fastening studs or bolts are tightened, thus drawing the upper and lower flanges 2, 5, towards one another. This has the effect of placing the seal element 21 under compression, again leading to the formation of a seal around the exterior of the casing 26. In addition, the tapering surfaces 87, 90 of the guide protrusion 7 and the upper guide ring 88 press against the corresponding tapering surfaces 77, 78 of the slip ring 76, thus driving the slip ring 76 axially inwardly. The slip ring 76 will contract, thus engaging with and gripping the outer surface of the casing 26.

The skilled reader will understand that the slip ring 76 can be driven axially inwardly more firmly, since it is forced inwardly from both above and below.

As before, the jacking screws 25 may be used during the setting procedure. Also, as explained above, the radial screws 84 may be driven inwardly to hold the slip ring 76 in position once the third sealing device 74 has been fully installed around the casing 26.

Finally, the third sealing device 74 includes a holding screw 91 which extends through the wall of the retaining cylinder 3 at an angle, and is received in a blind threaded bore 92 formed in the slip ring 76 (in the example shown, this bore 92 us formed in the upper inclined face 78 of the slip ring 76). This holding screw 91 can be used to hold the slip ring 76 in the "open" position (i.e. relatively expanded, so that it will not significantly engage with the wall of the casing 26). This may be used when it is not desired to engage the slip ring 76, for instance when the third sealing device 74 is first being installed onto the end of the casing 26.

While the third sealing device 74 described above has a generally circular slip ring 76 with a break therein, it should be understood that this embodiment could equally have a number of individual spaced-apart slip elements. However, it is envisaged that these would be "floating" within the device, and would not be constrained to travel along guide slots, as is the case for the second sealing device 30.

Figure 17:
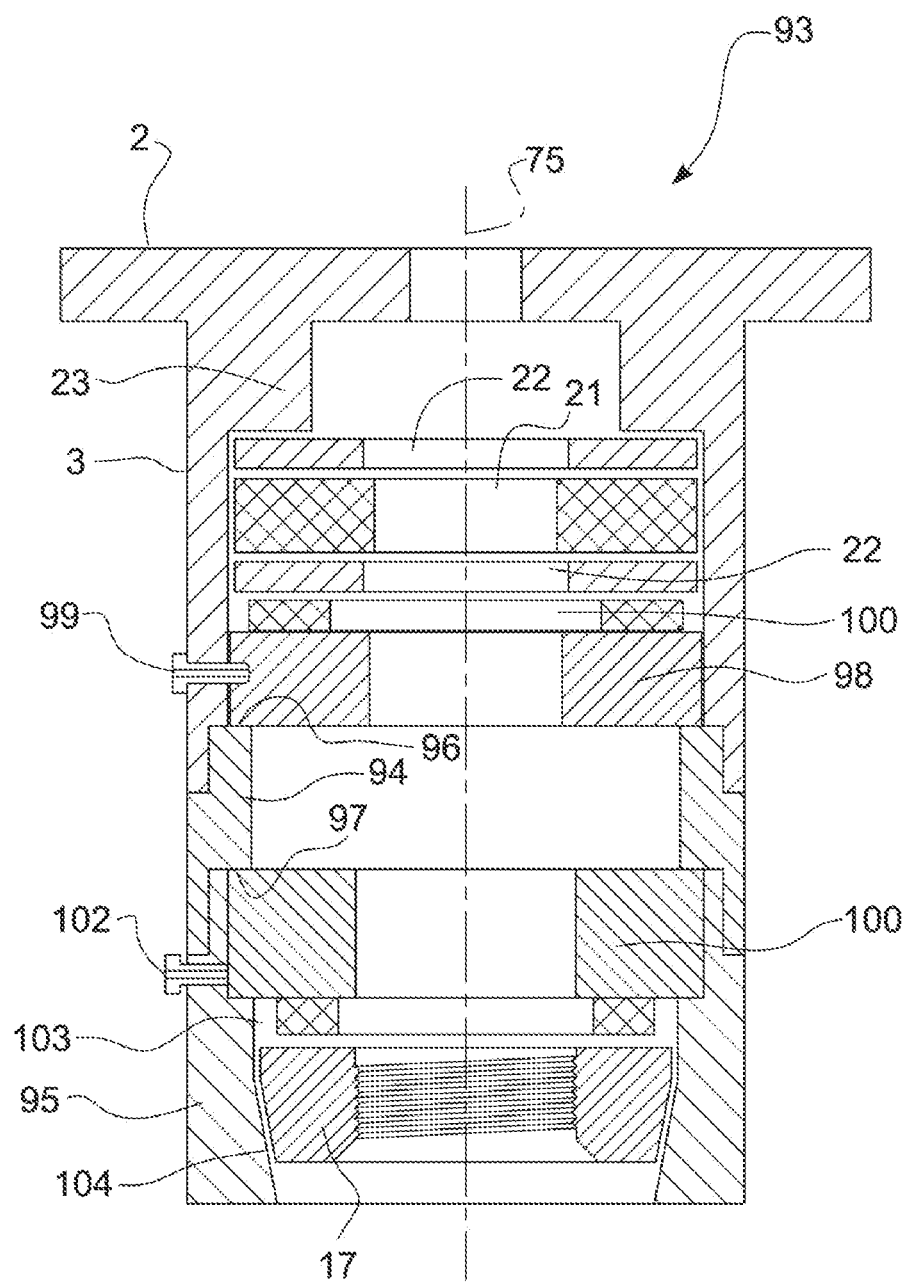
FIG. 17 shows components of a fourth sealing device embodying the present invention.

Turning to FIG. 17, components of a fourth sealing device 93 are shown. Once again, only components that lie on one side of the central axis 75 are shown, for the purposes of clarity. In common with the first sealing device 1, the fourth sealing device has a top flange 2 with a retaining cylinder 3 protruding therefrom. The retaining cylinder preferably has a load ring 23 at its top end, and a sealing ring 21, with anti-extrusion rings 22 on either side thereof, rests on the load ring 23.

The fourth sealing device 93 further comprises a middle cylinder 94, which is attached to the lower end of the retaining cylinder 3, and a bottom cylinder 95, which is attached to the lower end of the middle cylinder 94. The inner diameter of the middle cylinder 94 is less than that of the retaining cylinder 3 or of the bottom cylinder 95. The middle cylinder 94 therefore protrudes into the interior of the device 93, and presents upward- and downward-facing shoulders 96, 97.

A hydraulic seal drive 98 is provided within the retaining cylinder 3. The hydraulic seal drive 98 is preferably generally ring-shaped, and lies on, or above, the upward-facing shoulder 96 presented by the middle ring 94. A first supply 99 of hydraulic fluid passes through the wall of the retaining cylinder 3, to supply hydraulic fluid to the hydraulic seal drive 98. When pressurised hydraulic fluid is provided to the hydraulic seal drive 98, one or more actuators 100 protrude upwardly from its upper surface. A single ring-shaped or part ring-shaped actuator 100 may be provided (as shown in FIG. 17), or alternatively a number of separate spaced-apart actuators may be provided.

When the actuator 100 is activated in this way, the seal element 21 is placed under compression between the actuator 100 and the load ring 23. The seal element 21 therefore forms a firm and reliable seal against the exterior of a casing (not shown) received within the device 93.

Similarly, a hydraulic slip drive 101 is provided within the bottom cylinder 95, and lies on, or below, the downward-facing shoulder 97 presented by the middle ring 94. A second supply 102 of hydraulic fluid passes through the wall of the retaining cylinder 3, to supply hydraulic fluid to the hydraulic slip drive 98. When pressurised hydraulic fluid is provided to the hydraulic seal drive 98, one or more actuators 103 protrude downwardly from its lower surface. Again, a single ring-shaped or part ring-shaped actuator 103 may be provided (as shown in FIG. 17), or alternatively a number of separate spaced-apart actuators may be provided.

The lower end of the bottom cylinder 95 has an inwardly tapered wall 104, and a slip ring 17 (which is, in this example, similar to the slip ring 17 of the first sealing device 1) is provided within this inwardly tapered wall 104. The slip ring 17 is positioned below the hydraulic slip drive 101.

When the actuator 103 is activated through the introduction of pressurised hydraulic fluid, the slip ring 17 is driven downwardly by the actuator 103 against the tapered wall 104 of the lower cylinder, thus causing the slip ring 17 to contract and engage with the outer wall of a casing, as has been described above.

The fourth sealing device 94 has the advantage that it can be at least partly operated using hydraulic fluid, rather than through the manual tightening of bolts, screws and the like. This may be advantageous where fast installation is needed, or where it would be difficult or impossible to gain the access needed to tighten the screws or bolts.

While two separate hydraulic systems are shown in FIG. 17, it is envisaged that these could be replaced by a single a single hydraulic system. In one such example, the single hydraulic system could have one or more actuators that extend outwardly both in the upward and downward direction, to exert forces on the seal element and the slip ring. Alternatively, one or more actuators could extend from only the top or the bottom surface of the hydraulic system, and the hydraulic system could be positioned to expand axially between the seal element and the slip ring, thus exerting appropriate axial forces on both of these components.

While the discussion above includes hydraulic actuators, any other kind of suitable actuators could be used, and the invention is not limited to the use of hydraulic actuators.

In this example, when hydraulic fluid is supplied, the actuators extend to exert forces on the sealing element and slip ring. In alternative embodiments, the actuators may be biased (for example, by one or more springs) to exert these forces, and are withdrawn (i.e. these forces are ceased or reduced) when hydraulic fluid is supplied. Some of the advantages of an arrangement of this kind are discussed below.

In the above examples, the slip ring or separate slip elements are driven into engagement with the exterior of the casing using one or more inclined planes. The slip ring or separate slip elements is/are driven axially, and are deflected inwardly by the inclined plane(s).

In other embodiments, however, the device may be provided with one or more slip elements that are driven radially or substantially radially inwardly to engage with the outer surface of the casing. For instance, hydraulically-driven slip elements may be provided.

In one such example, a series of radially spaced-apart slip elements are positioned around the device, each one having a separate hydraulic actuator which is configured to drive the slip element radially inwardly. A single source of pressurised hydraulic fluid is preferably arranged to supply fluid to all of the actuators at once. Before the actuators are activated, the slip elements lie at a sufficiently large distance from the central axis of the device to allow the device to be placed over the free end of the casing. Once the casing is in place with respect to the device, the actuators are activated, thus driving the slip elements inwardly to engage with and grip the outer surface of the casing.

When the device is to be removed, the supply of pressurised fluid to the actuators is ceased, so that the slip elements can be withdrawn radially away from the casing. The slip elements may be spring-biased away from the central axis of the device to facilitate this.

As an alternative, the slip elements may be spring biased inwardly, towards the central axis of the device. Preferably, the spring biasing is sufficiently strong that it will maintain sufficient grip between the slip elements and the casing to hold the device in place with respect to the casing. Hydraulic actuators are provided that, when actuated, withdraw the slip elements radially away from the central axis of the device, against the spring biasing. The actuators are therefore only used during installation and removal of the device.

One advantage of this alternative is that, once the device has been installed, it will remain in place through the spring biasing, and it will not be necessary to keep supplying hydraulic fluid to the actuators to keep the device in place. Since the device may be left in place for days, weeks or longer, it may be preferable not to need to keep supplying hydraulic fluid during this time.

As will be appreciated from the above discussion, there are several ways in which a firm engagement can be made between the device and a casing. The invention is not limited to the techniques shown in the specific examples. In particular, there are several different types of grip arrangements that are used in "fishing tools", i.e. tools which are adapted to grab and retrieve components which are loose within a wellbore. Many of these techniques will be compatible with devices embodying the invention, and the skilled reader will understand how them may be adapted for this purpose.

In the above discussion, the seal element is provided above the grip arrangement. However, it should be understood that in other embodiments the seal element may be provided below the grip arrangement.

Also, in the examples shown above, the sealing device comprises a main body which is formed from two or more pieces, e.g. the top cylinder and bottom cylinder of the second sealing device. It is envisaged that, in other embodiments, the sealing device may comprise a main body having only one piece, which contains the grip arrangement and seal element. In such embodiments, it may be necessary to deform some components to place them within the one-piece main body, or insert the components in two or more sections and then assemble them within the one-piece main body.

Figure 18:
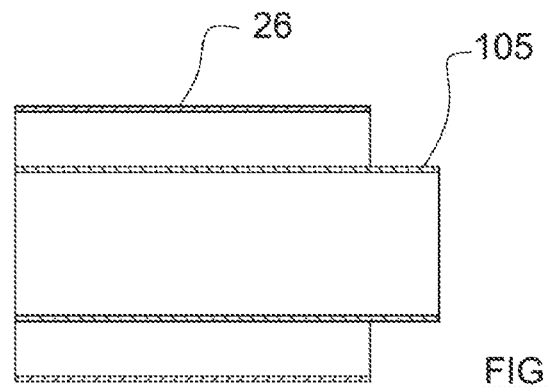
FIGS. 18 to 20 show use of a flow diverter with a sealing device according to the above.
Figure 20:
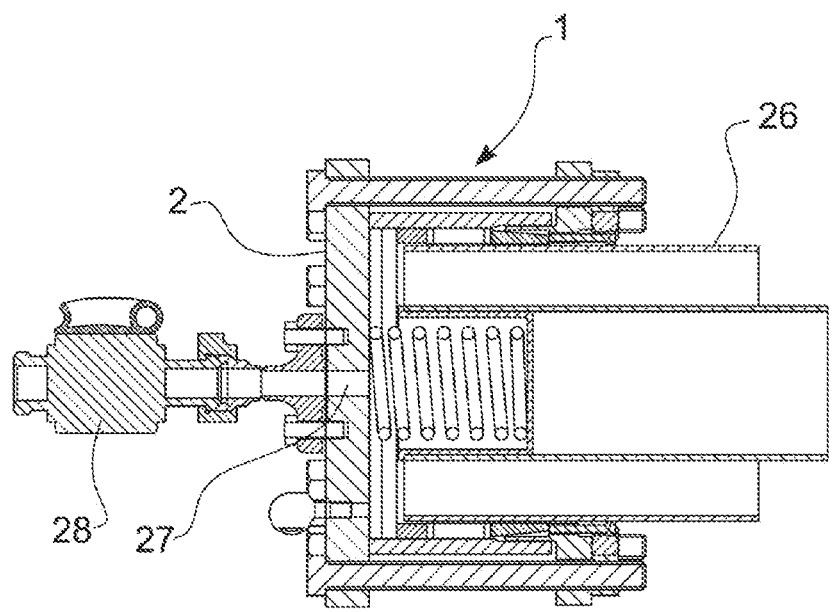

With reference to FIGS. 18 to 20, a further method of use of a device embodying the present invention is shown. This example involves the variation on the first sealing device 1 shown in FIGS. 7 and 8, but any of the designs of sealing device disclosed herein may also be used.

With reference firstly to FIG. 18, as well as the casing 26 with which the first sealing device 1 will engage, an inner casing 105 is present within the first casing 26 (referred to as the outer casing 26 in this example). The inner casing 105 is generally coaxial with the outer casing 26, as is standard.

Before the installation begins, it may be necessary to cut one or both of the outer and inner casings 26, 105 so they each present a flat or substantially flat free end.

With reference to FIG. 19, a flow diverter 106 is placed over the free end of the inner casing 105. The flow diverted 106 takes the form of a cup 107 having a closed bottom end and an open top end, with a peripheral flange 108 surrounding the top end. The flow diverter 106 is dimensioned so that the cup 107 thereof can fit into the open end of the inner casing 105, with the flange 108 resting on the free end of the inner casing 105. The diameter of the flange 108 is greater than that of the inner casing 105, so the flow diverter 106 cannot fall into the inner casing 105.

A compression spring 109 (or a similar biasing arrangement) is placed into the cup 107, so that it rests against the closed bottom of the cup 107, and also protrudes from the open free end of the cup 107.

The first sealing device 1 is then placed over the free ends of the inner and outer casings 105, 26, so that the spring 109 engages with the inner side of the top flange 2, and is compressed between the bottom of the cup 107 and the inner side of the top flange 2. The spring 109 will at least partially bear the weight of the sealing device 1, and ensure that a gap exists between the free end of the outer casing 26 and the inner end of the top flange 2. It will therefore be understood that the flow diverter 106 is held in place, in the open end of the inner casing 105, by the spring 109.

The first sealing device 1 is attached to the outer casing 26, as is described below.

Fluid is then introduced into the interior of the first sealing device 1, through the regulator 28, which is fitted into the central aperture 27 in the top flange 2. It will be understood that this fluid may flow into the cup 107, but will then flow out of the cup 107 and around the inner casing 105, into the annular space between the inner and outer casings 105, 26. The flow diverter 106 therefore prevents the fluid from entering the inner casing 105.

Figure 21:
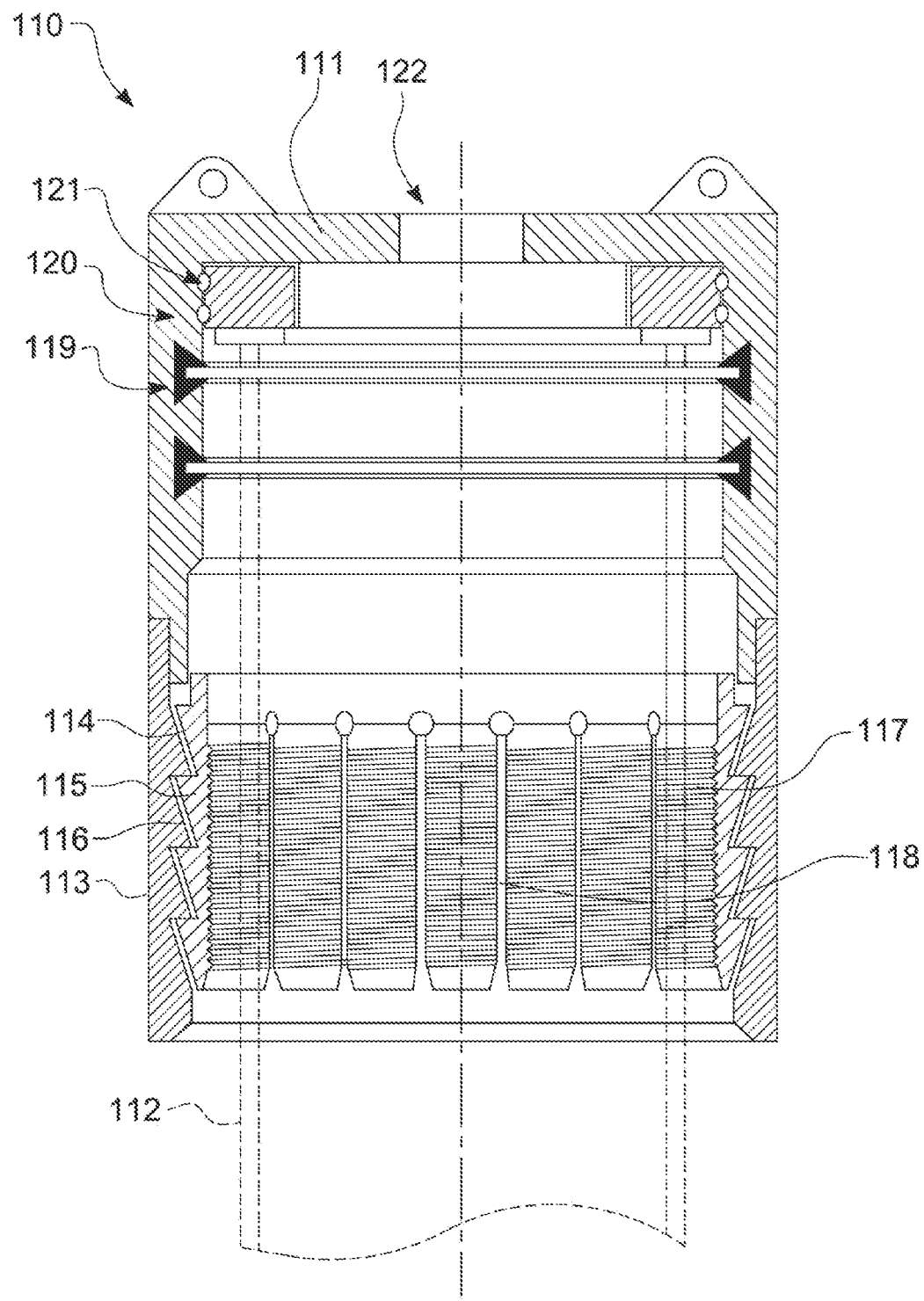

FIG. 21 shows a further example of a sealing device 110 embodying the present invention. In common with other examples discussed above, the further sealing device 101 comprises a top cylinder 111 which fits over the free end of a casing 112. The top cylinder is attached to a bottom cylinder 113 which has, on its inner face, a series of spaced-apart inclined surfaces 114. Within the lower cylinder 113 is a slip element 115 which has a series of spaced-apart inclined surfaces 116, which are generally shaped to match the inclined surfaces 114 provided on the inner surface of lower cylinder 113.

The inner surface of the slip element 115 comprises a series of ribs or ridges 117, as discussed above the slip element 115 further has a series of generally parallel breaks 118 formed therein, extending over most, but not all, of the length of the slip element 115. As discussed above, these breaks 118 increase the flexibility of the slip element 115 and the allow the extension/contraction thereof.

On the interior of the upper cylinder 111 a pair of lip seals 119 are provided. As will be understood by those skilled in the art, a lip seal comprises a ring of a flexible material such as a rubber material, having a pair of protruding lips. In the arrangement shown in FIG. 21, the lip seals are provided around the exterior of the casing 112, and the lips protrude inwardly. The size of each lip seal 119 is set to match closely to the external diameter of the casing 112, so that the lips lie against the exterior of the casing 112. As the skilled reader will understand, high pressure from either above or below each lip seal 119 will cause one of the lips to seal tightly against the exterior of the casing 112. As pressure increases, the strength of the seal between the lip seal 119 and the casing 112 will increase.

While two lip seals 119 are shown in FIG. 21, it is envisaged that, in other embodiments, only one seal 119 may be provided.

A lip seal is only one example of a seal that may be used in embodiments of the invention. The skilled reader will be aware of many different types of seal that can be employed, and any suitable type of seal may be used in this and other embodiments. In particular, it is envisaged that metal to metal seals, and expandable metal seals, may be used with embodiments of the invention.

Accommodated within the top end of the top cylinder 111 is a hydraulic cylinder 120, which is held within a retainer 121. The hydraulic 120 is arranged to press downwardly against the free, top end of the casing 112 when it is activated.

In use, the further sealing device 110 is placed over the free end of the casing 112 so that free end of the casing 112 passes through the interior of the device and lies against, or close to, the hydraulic cylinder 120. The hydraulic cylinder is then activated, and extends downwardly with respect to the retainer 121. The skilled reader will understand the effect of this is to lift the top cylinder 111 and bottom cylinder 113 upwardly with respect to the casing 112. This will cause the inclined surfaces 114 on the interior of the bottom cylinder 113 to engage with the inclined faces 116 of the slip element 115, thus radially compressing the slip element 115 and causing the ribs or ridges 118 on its interior to bite into the exterior of the casing 112.

As with previous embodiments, a central aperture 122 is provided in the centre of the top surface of the top cylinder 111, to allow the connection of a suitable tool.

In the above embodiments, the slip arrangement and the seal are both positioned on the exterior of the casing. However, in other embodiments, one or both of the slip arrangement and the seal may be positioned on the inside of the casing. Some examples of this are shown below.

Figure 22:
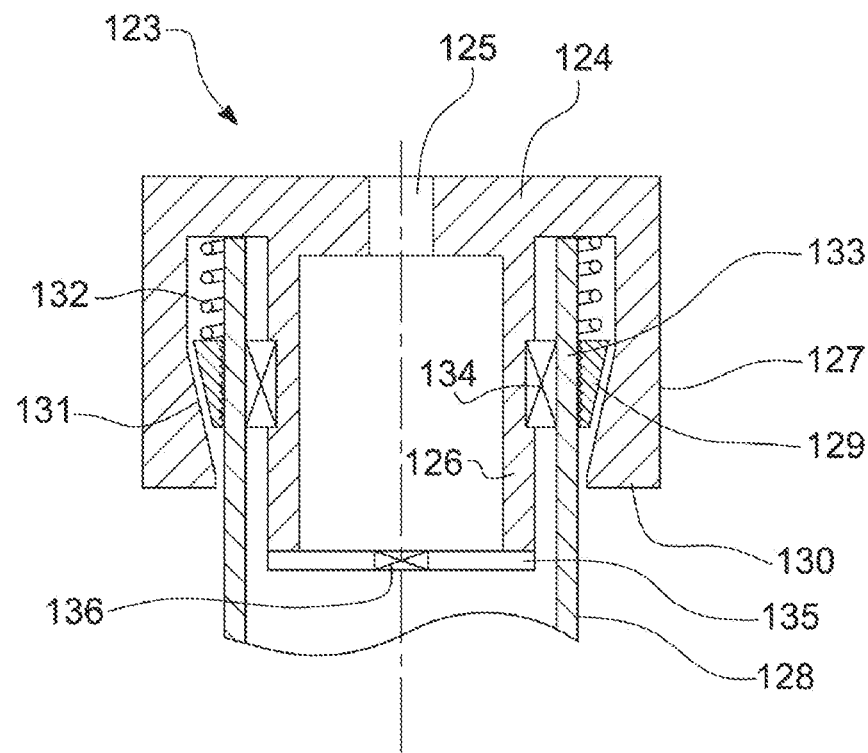

With reference firstly to FIG. 22, a sealing device 123 is shown which has a top cap end 124, which is generally circular in shape, and has (as with other embodiments discussed above) a central aperture 125 formed therethrough.

Projecting downwardly from the top cap end 124 are an inner cylinder 126 and an outer cylinder 127, with a space formed therebetween. In the example shown the inner cylinder 126 is longer than the outer cylinder 127.

In use, when the sealing device 123 is placed over the free end of a casing 128, the casing 128 fits into the space between the inner cylinder 126 and the outer cylinder 127.

In the example shown in FIG. 22, a grip element 129 is provided within the outer cylinder 127. In this embodiment, the slip element 129 is similar to the slip element 17 of the first seal device 1 shown in FIGS. 1 to 6. However, any type of suitable slip element may be used. The slip element 129 has a tapered outer surface 130, which fits within a correspondingly tapered section 131 formed on the inner surface of the outer cylinder 127.

A spring 132 is positioned between the inside surface of the top end 124 and the slip element 129, which biases the slip element 129 downwardly with respect to the cap top end 124, and hence into engagement with the outer surface of the casing 128.

Any other suitable method for causing the slip element to engage with the outer surface of the casing may be used.

A seal element 133 is provided on the outer surface of the inner cylinder 126, and positioned to engage with the inner surface of the casing 128. In the example shown, the seal element 133 is similar to the seal element 21 of the first seal element 1 described above. The seal element 133 is, in this example, positioned within a recess 134 formed in the outer surface of the inner cylinder 126. Anti-extrusion rings may be provided on one or both sides of the seal element 134, as discussed above.

Any suitable method may be used to compress the seal element 133 to form a seal between the inner seal of 126 and the casing 128. For instance, one or more bolts (not shown) may extend downwardly through the top end cap 124 and protrude axially downwardly to engage with a top end of the seal element 134. The bolts may be extended further to compress the seal element 134 downwardly, thus causing the seal element 134 to bulge outwardly and form a seal against the inner surface of the casing 128.

In other examples, a "swelling" seal may be used, which is formed from an elastomer or other suitable material that will swell when exposed to certain substances such as hydrocarbons. In such embodiments, when the sealing device 123 is first installed over the end of the casing the swelling seal element will not engage firmly against the inner surface of the casing 128. However, over a period a time, the seal will swell and expand against the inner surface of the casing 128, thus forming a firm and reliable seal.

A swelling seal may be used with any of the embodiments described herein, and this is not limited to arrangements where the seal is formed with the interior of the casing.

In the embodiment shown in FIG. 22 the lower end 135 of the inner cylinder 126 is substantially sealed, with a rupture disc, float valve or similar element being provided in an aperture formed in the lower end 135. This is not essential, however.

Figure 23:
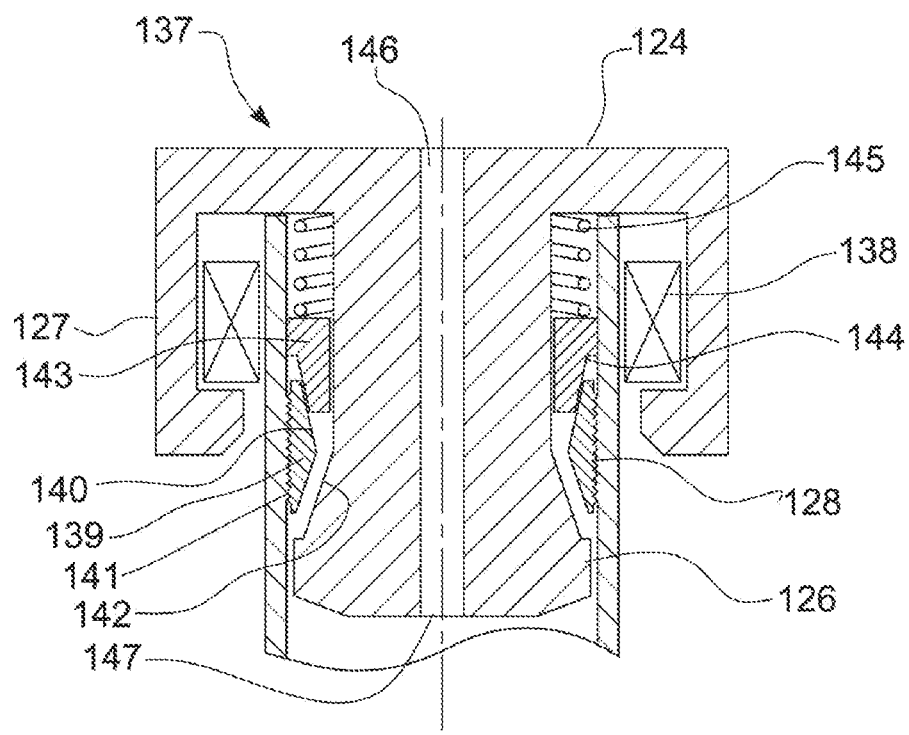

Turning to FIG. 23 a further sealing device 137 is shown. Once again, the sealing device 137 has a cap top end 124, from which an inner cylinder 126 and an outer cylinder 127 protrude. As with the previous embodiment, when the sealing device 137 is placed over the free end of a casing 128, the casing fits into a space between the inner cylinder 126 and the outer cylinder 127.

In this case, the seal element 138 is provided on the outer side of the casing 128, and is positioned on the inner side of the outer cylinder 127. Once again, the seal element 138 can be "set" in any suitable manner.

In this embodiment the slip element 139 is provided within the casing 128. In this example the grip element 139 is similar in design to the slip element 76 of the third sealing device 74, shown in FIG. 16. The slip element 139 has, on its inner side, upper and lower opposing inclined surfaces 140, 141. The lower inclined surface 141 generally matches a tapered outer surface 142 of the inner cylinder 126.

A guide ring 143 is positioned above the slip element 139, in the space between the inner cylinder 126 and the inner side of the casing 128, and has an inclined driving surface 144, which is angled to engage with the upper inclined surface 140 of the slip element 139. A spring 145 is provided between the guide ring 143 and the inner side of the cap top end 124, to bias the guide ring 88 downwardly and into contact with the slip element 139.

It will be understood that, under the action of the spring 145, the slip element 139 will be driven outwardly through interaction with the inclined faces 144, 142 of the guide ring 143 and the inner cylinder 126, and hence driven to expand outwardly and into engagement with the inner side of the casing 128.

It should be understood that, in embodiments where the slip arrangement is provided on the inner side of the casing, any suitable type of slip arrangement may be used, and the invention is not limited to the particular types of slip arrangements which have been discussed in connection with embodiments where the slip arrangement is on the inside of the casing.

In yet further embodiments it is envisaged that both the seal element and the slip arrangement may be provided on the inside of the casing, rather than the outside. The skilled reader will readily understand how this may be achieved. For instance, however, with reference to the embodiment shown in FIG. 23, the seal element could be provided between the spring 145 and the guide ring 143, with the seal element being compressed by the same force provided by the spring which biases the guide ring 143 into contact with the slip element 139. Many other potential arrangements are possible, however.

In the embodiment shown in FIG. 23 a continuous passage 146 passes through the interior of the inner cylinder 126, to allow the passage of fluid through the sealing device 134. Once again, a rupture disc, float valve or similar element is provided at the lower end of the passage 146.

FIGS. 24 and 25 show examples in which both the grip arrangement and the seal are positioned within the casing. In these examples, in contrast to arrangements shown in FIGS. 22 and 23, the seal devices do not have spaced-apart inner and outer cylinders, with the free end of the casing fitting within the space between the cylinders. Instead, these examples include a single inner cylinder (which may, if necessary, be formed in two or more pieces), and top flange which has a larger diameter than that of the inner cylinder. When the seal devices are installed on the free end of a casing, the inner side of the top flange lies on the free end of the casing, with the inner cylinder being received within the casing.

One advantage of arrangements of this kind is that the radial space within a wellbore taken up by the sealing device is minimised. The outer diameter of the sealing devices can be, as may be seen from FIGS. 24 and 25, approximately the same as, or only slightly more than, the outer diameter of the casing itself.

Turning to FIG. 24, the sealing device 148 has a top flange 149, and an inner cylinder 150. A seal element 151 is provided in a circumferential recess 152 formed in the outer surface of the inner cylinder 150. A series of compression bolts 153 pass through the top flange 149 and may be advanced to compress the seal element 151, as discussed above.

Below the seal element 151 and its associated recess 152, there is a further recessed section 154 of the inner cylinder 150, which has a helical section, forming (as discussed in connection with other embodiments) a series of axially spaced apart inclined surfaces 155. These inclined surfaces 155 taper outwardly, i.e. each one is narrowest at its end closest to the top flange 149, and widens in a direction passing downwardly away from the top flange 149.

A grip element 156 has a sleeve configuration, and is positioned around the further recessed section 154. On its inner side, the grip element 156 has a helical configuration, forming a series of spaced-apart inclined surfaces 157, which are formed generally to match the inclined surfaces 155 of the further recessed section 154. The outer side 158 of the grip element 156 has a grip arrangement, which may take any form, such as a series of ribs or ridges. The grip element may have one or more breaks (not shown) formed therein to allow expansion and contraction of the grip element 156.

At the lower end of the inner cylinder 150 a nut 159 is screwed onto a corresponding thread, and a washer 160 is provided above the nut 159. The removable nut 159 facilitates assembly of the components of the sealing device 148.

The sealing device 148 further comprises a load ring 174 or thrust washer, which is positioned on top of the free end of the casing 161, and which has an annular shape which covers the surface of the free end of the casing 161. A series of drive bolts 175 pass through the top flange 149, near the perimeter thereof, and the ends of the drive bolts 175 are aligned with the load ring 174.

Once the sealing device 148 has been placed over the free end of a casing 161, the drive bolts 175 are tightened, which will have the effect of lifting the sealing device 148 upwardly with respect to the casing 161, which in turn will move the inclined surfaces 155 of the inner cylinder 150 axially with respect to the grip element 156, causing the grip element 156 to expand and bite into the inner surface of the casing 161.

Once this has been done, the compression bolts 153 may be tightened to apply compression to the seal element 151, causing the seal element 151 to expand and seal against the inner surface of the casing 161.

Preferably, the helical shape of the grip element 156 is a left-handed helix. This means that, as part of the removal of the sealing device 148, the sealing device may be rotated clockwise, which will cause the grip element 156 to contract and bite less firmly into the casing 161, as the skilled reader will understand.

With reference to FIG. 25, another sealing device 162 is shown. In this example, the seal is positioned below the grip arrangement.

This sealing device 162 again has a top flange 149 and an inner cylinder 150 which fits within a casing 161. A grip element 163 has a tapered inner surface 164, which is arranged to interact with a tapered guide surface 165 formed on the outer surface of the inner cylinder 150. An outer surface 166 of the grip element 163 has ribs, ridges or the like formed thereon. A spring 167 is provided between the bottom surface of the top flange 149 and the grip element 163. As will be understood from the previous examples, the spring 167 will drive the tapered surface 164 of the grip element 163 against the guide surface 165, thus causing the grip element 163 to expand and engage with the inner surface of the casing 161.

The sealing device 162 includes a cup-shaped seal element 168, which flares outwardly and downwardly (i.e. in a direction away from the top flange 149). The outer edge 169 thereof lies against or adjacent the inner side of the casing 161. The inner edge 170 of the seal element fits closely around the outer surface of the inner cylinder 150, and has upper and lower seals 171, on either side the inner edge 170 to ensure that the inner edge 170 fits snugly into a circumferential recess formed in the outer cylinder 150.

Once again a nut 173 is threaded onto the lower end of the inner cylinder 150, and this assists in the assembly of the sealing device 162.

It will be understood that, if there is high fluid pressure within the wellbore below the sealing device 162, the seal element 168 will press more tightly against the inner surface of the casing 161. This will therefore effectively prevent high-pressure fluid in the wellbore from rising upwardly past the sealing device 162.

The skilled reader will recognise that the cup-shaped seal element 168 resembles a packoff cup assembly. Cup-shaped seals of this kind may also be used where the seal is provided on the exterior of the casing, and the skilled reader will understand how this may be achieved.

As an alternative to the examples discussed above, a rotational arrangement may be provided to drive the slip arrangement into engagement with the casing. For instance, if a series of slip elements are provided around the exterior of the casing (in a similar manner to the embodiment shown in FIGS. 9 to 12), a drive ring may be arranged to interact with the slip elements. The drive ring may have, at spaced intervals around its circumference, radially-tapered drive faces (which may, in some examples, take the form of generally triangular notches formed in the inner side of the drive ring). In an initial position, each slip element may be aligned with a part of each drive face that is relatively radially far from the central axis of the main body. The drive ring may then be driven to rotate, so that each slip element becomes aligned with a part of the corresponding drive face that is radially closer to the central axis of the main body. The slip elements may therefore be driven radially inwardly through rotation of the drive ring.

Similarly, rotation of the drive ring in the other direction will allow the slip elements to move away from the casing, as part of a removal procedure.

The skilled reader will understand how the drive ring may be rotated as desired.

As a further example, a drive ring (or similar rotatable element) may have a series of axially tapered drive faces, for instance where the depth or thickness of the ring varies, or where the ring has one or more inclined protrusions on its surface. Once again, a series of individual slip elements may be provided, which may (as in the example shown in FIGS. 9 to 12) be axially slidable with respect to an inclined face. In an initial position, each slip element may be aligned with a first part of a tapered drive face. As the ring is rotated, each slip element becomes aligned with a second part of the tapered drive face, and the slip element is driven axially by interaction with the tapered drive face. This could, for example, drive the slip element axially with respect to an inclined surface which in turn drives the slip element into engagement with the casing.

The skilled reader will understand how such embodiments may be arranged, both for examples where the slip element (s) are positioned outside the casing, and where the slip element(s) are positioned inside the casing.

The examples shown in FIGS. 24 and 25 fit primarily inside the casing, and have a flange that extends radially outwardly from the main body, to lie on top of the free end of the casing. While this is preferred, it is also envisaged that the entire sealing device may fit into the casing, so that it may be inserted fully into the casing below the free end thereof.

Figure 26:
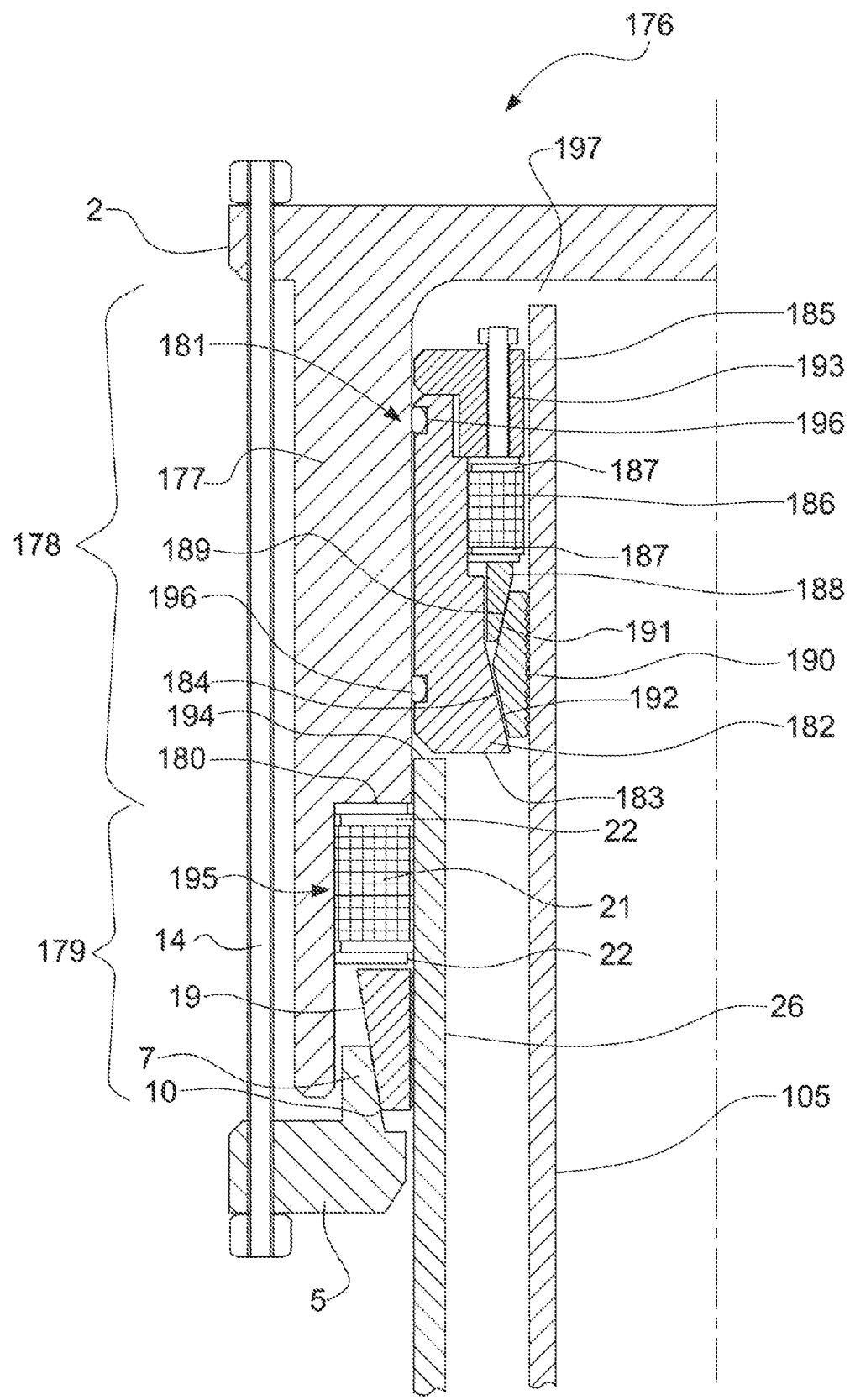
FIGS. 26 and 27 shows components of two variations of another sealing device embodying the present invention.

FIG. 26 shows a further sealing device 176, which is adapted to form separate seals against an inner casing 105 and an outer casing 26, as discussed above.

For use of this sealing device 176, it is necessary for the outer casing 26 to be cut to a length which is shorter than that of the inner casing 105. In other words, the inner casing 105 must protrude upwardly beyond the level of the outer casing 26.

The sealing device 176 comprises a retaining cylinder 177 which has an upper flange 2, as discussed above.

The retaining cylinder 177 has a first internal diameter in a first region 178, which is closest to the upper flange 2. The retaining cylinder 177 has a second, larger internal diameter in a second region 179, which is further from the upper flange 2 than the first region 178. The retaining cylinder therefore has a stepped internal profile, and where the first and second regions 178, 179 meet, a downward-facing shoulder 180 is formed.

In common with the embodiment shown in FIGS. 1-4, the sealing device 176 includes a lower flange 5 with a generally cylindrical guidance protrusion 7 protruding upwardly therefrom, and having a tapered inner wall 10.

Fastening bolts 14 pass between the upper flange 2 and the lower flange 5, in a similar manner to that described in the embodiments shown in FIGS. 1-4.

The sealing device 176 has two separate sealing arrangements, a first one 181 of which is provided within the first region 178 of the retaining cylinder 177, to seal against the inner casing 105, and a second one 195 of which is provided within the second region 179 of the retaining cylinder 177, to seal against the outer casing 26.

The first sealing arrangement 181 is similar in some aspects to that shown in FIG. 23. A housing 182 is provided within the interior of the retaining cylinder 177, in the first region 178 thereof. The housing 182 has a lower portion 183 with a tapered inner surface 184. A top ring is provided immediately above the housing 182, and a sealing ring 186 is provided in a recess between the housing 182 and the top ring 185. The sealing ring 186 is, as has been discussed elsewhere, surrounded on both sides by anti-extrusion rings 187.

Beneath the sealing ring 186 is a guide ring 188, which has a tapered internal driving surface 189.

Between the tapered surface 184 of the lower part 183 of the housing 182 and the tapered driving surface 189 of the guide ring 188, a grip element 190 is positioned, with the grip element 190 having lower opposing inclined surfaces 191, 192. It will be appreciated that this is similar to the grip element 139 shown in FIG. 23.

An energising bolt 193 passes through a threaded aperture in the top ring 185, and is operable to compress the sealing ring 186, and in turn drive the guide ring 188 downwardly, thus driving the grip element 190 inwardly to bite against the outer surface of the inner casing 105.

The components of the first sealing arrangement 181 will be familiar from the embodiments described above.

It is anticipated that, in use of the sealing device 176, the first grip arrangement 181 will be installed onto the upper end of the inner casing 105 before the retaining cylinder 177 is installed. The first grip arrangement 181 is placed over the upper end of the inner casing 105. The energising bolt 193 may be activated, for example, through the action of a hydraulic actuator, such as a hydraulic cylinder (not shown) to cause the grip element 190 to grip against the outer surface of the inner casing 105, and the sealing ring 186 will deform to form a firm seal against the outer surface of the inner casing 105.

The retaining cylinder 177 is then placed over the inner and outer casings 105, 26, with a gap 197 being present between the upper end of the inner casing 105 and the inner surface of the upper flange 2, as will be understood from the discussion above. As can be seen from FIG. 26, when this is done, a space exists in the first region 178, above the top free end 194 of the outer casing 26, in which the first grip arrangement 181 is positioned. A sealing arrangement is preferably provided to form a fluid-tight seal between the housing 182 and the inner wall of the first region 178 of the retaining cylinder 177. In the embodiment shown, the sealing arrangement takes the form of first and second O-rings 196. Preferably the top free end 194 of the outer casing 26 lies above the level of the downward-facing shoulder 180, which lies at a position where the first and second regions 178, 179 meet each other. In some embodiments the first grip arrangement 181 may be supported by the top free end 194 of the outer casing 26.

The second sealing arrangement 195 is positioned below the downward-facing shoulder 180, beside the outer wall of the outer casing 26.

The second sealing arrangement 195 is similar to the sealing arrangement included in the embodiment shown in FIGS. 1-4. A guide protrusion 7 protrudes upwardly from the lower flange 5, and has a tapered inner wall 10. A slip ring 17 has a tapered outer wall 19, and an inner wall 20 with a gripping arrangement formed thereon. Above the slip ring 17 is a sealing ring 21, with anti-extrusion rings 22 on both sides thereof. The upper anti-extrusion ring 22 is braced, directly or indirectly, against the downward-facing shoulder 180. As discussed above, when the fastening bolts 14 are tightened, the slip ring 17 is driven into the guide protrusion 7, and contracts through the interaction of the inclined faces 10, 19 of the slip ring 17 and guide protrusion 7. As this occurs the inner wall 20 of the slip ring 17 bites into the outer surface of the outer casing 26, and the sealing ring 21 is deformed to form a seal against the outer casing 26.

It will be understood that the first sealing arrangement 181 may, when activated, bite into and grip the outer surface of the inner casing 105. The second sealing arrangement 195 may bite into and grip the outer surface of the outer casing 26. Moreover, the two sealing arrangements 181, 195 may be actuated and operated independently of one another.

Embodiments of this kind will be useful where inner and outer casings are present, and where it is desirable to form independent seals against both the inner and outer casings. In particular, embodiments of this kind can provide isolation between the interior of the inner casing 105, and the annular gap between the inner and outer casings 105, 26.

Figure 27:
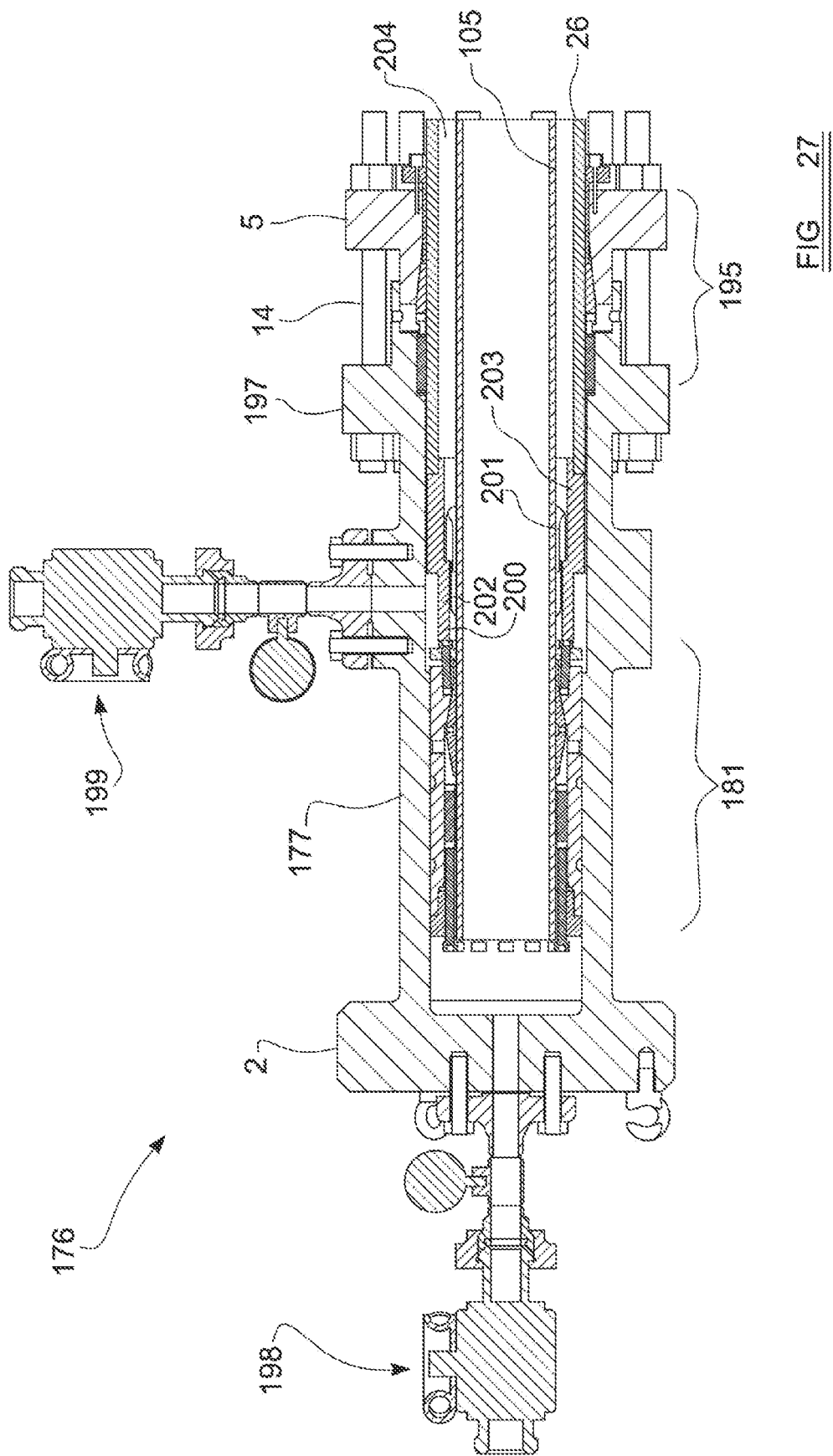

Referring to FIG. 27, a modified version of the sealing device 176 of FIG. 26 is shown. The first and second grip arrangements 181, 195 are indicated generally, without their individual components being labelled. The major features of the embodiment shown in FIG. 27 are generally identical to those in the embodiment of FIG. 26. One exception is that the fastening bolts 14 in FIG. 27 do not extend to the top flange 2, but extend between the bottom flange 5 and an intermediate flange 197, which protrudes from the exterior of the retaining cylinder 177 at a point part-way along its length. However, the skilled reader will appreciate that this makes little or no difference to the operation of the sealing device 176.

First and second valve arrangements 198, 199 are included. The first valve arrangement communicates with an aperture formed in the top flange 2 and this is similar to the regulator shown in FIG. 20.

The second valve arrangement 199 communicates with an aperture formed in the side of the retaining cylinder 177, which is positioned between the first and second grip arrangements 181, 195.

In the embodiment shown in FIG. 27, a spacing element 200, which takes the form of a generally annular sleeve, is positioned between the lower end of the first grip arrangement 181 and the upper free end of the outer casing 26. The spacing element 26 has a series of slots or other apertures 201 formed therethrough, to allow communication between the inner and outer surfaces thereof.

In the embodiments shown the spacing element 200 has a generally stepped shape, having a relatively narrow upper part 202 (which is preferably spaced apart from both the retaining cylinder and the inner casing 105) and a relatively wide lower part 203 (which preferably lies against the inner surface of the outer casing 26. The apertures 201 extend across the step between the upper and lower portions 202, 203.

The aperture formed in the side of the retaining cylinder 177, with which the second valve arrangement 199 communicates, is positioned above the top free end of outer casing 26. In the embodiment shown, the aperture is aligned with the relatively narrow upper part 202 of the spacing element 200. The skilled reader will appreciate that the second valve arrangement 199 is therefore in fluid communication with the annular space 204 between the inner and outer casings 105, 26. The second valve arrangement 199 is therefore able to pump fluid into, or remove fluid from, this annular region 204, and/or monitor the pressure of fluid within this annular region 204.

In embodiments of this type, any suitable type of sealing arrangements may be used (for instance, where applicable, any of the types of sealing arrangement disclosed in this document may be used as either the first or second sealing arrangement), and the embodiment is not limited to the particular types of sealing arrangement shown in FIG. 26.

It is expected that sealing devices embodying the present invention will confer significant advantages compared to existing solutions for sealing abandoned or temporarily abandoned casings. These advantages include:

ease of installation, requiring only a casing end that is relatively cleanly cut with little or no further preparation;

the elimination of all API ring connections in the standard TPA (temporarily plug and abandon) cap configuration;

the elimination of the cost of dry hole tree;

ease of access for bull-heading cement or kill fluids;

the fact that sealing devices embodying the invention can be configured with variations in the top plate to accommodate BOPs (blow out preventers) and drilling spools for re-entry at a later date;

the fact the pressure within the casing can be monitored at all times with a gauge;

the elimination of lease operator expense (LOE) for valve maintenance and tree inspections;

elimination of the need for annual (or, as necessary) pressure and function tests of a dry hole tree;

that sealing devices embodying the invention can be configured to run in tandem with any hydraulic down hole isolation or other regionally required additional barriers (such as packers, cups, retainers and plugs), allowing the isolation of questionable top side casing integrity;

remote monitoring can be carried out using a single transducer installation using existing operator telemetry systems, or other third party systems; and the fact that sealing devices embodying the invention can be installed on conductor or surface pipes and can also isolate inner casing strings.

Several of the features disclosed above involve separate pieces or elements which do not move with respect to each other, which formed separately (for instance, the sealing ring and the associated anti-extrusion rings). It is envisaged that any or all of these features may be formed integrally with each other, rather than being fabricated as sub-assemblies.

Figure 14:
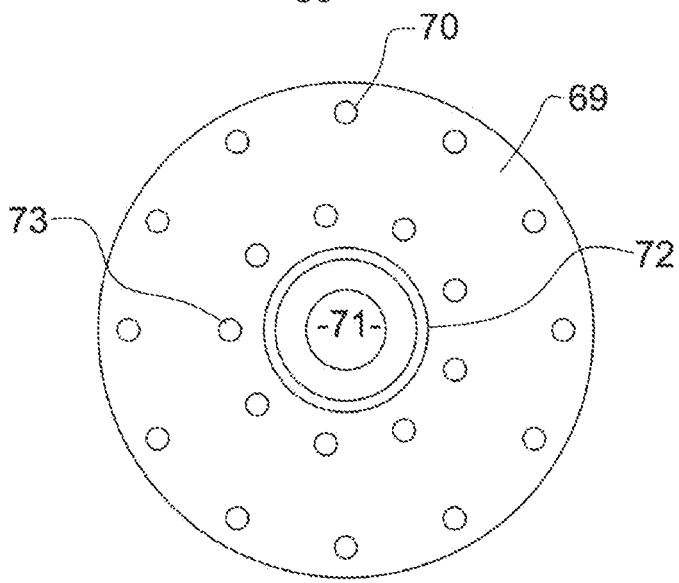
FIGS. 14 and 15 show a top surface which may be used with any of the sealing devices disclosed herein.
Figure 15:
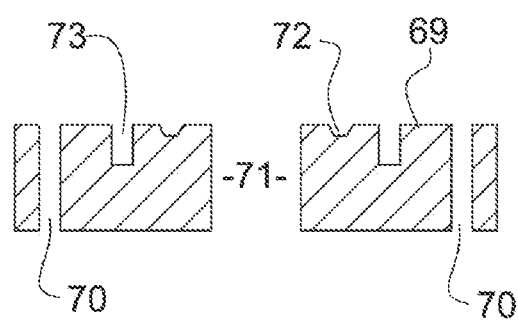

In connection with any of the embodiments described above, the top surface of the sealing device may include a tool attachment site, which may for example include a main aperture surrounded by a seal ring groove and attachment holes. An example of this is shown in FIGS. 14 and 15, which shows a top surface 69 of a sealing device embodying the present invention. This could be the top surface of the top flange 2 of the first or third sealing device 1, 74, or of the top cylinder 32 of the second sealing device 30. The top surface 69 has fastening holes 70 formed therethrough for attachment to other components of the sealing device, but (for instance as in the case of the second sealing device 30) these need not be present.

The top surface 69 has a central aperture 71 formed through the entire depth thereof, to allow access to the interior of the sealing device. Surrounding the central aperture 71 is a seal groove 72, which runs around the central aperture 71 and is circular or substantially circular. Surrounding the seal groove 72 is a series of fixing holes 73, which are preferably blind, threaded holes. In other embodiments, the fixing holes 73 may be radially within the seal groove 72, rather than outside it. Any other suitable fixing means may be provided as an alternative to the array of fixing holes 73.

In use, a tool may be attached to the top surface 69 by means of screws, bolts or studs attached to the fixing holes 73. An engagement surface of the tool may have a corresponding seal groove, which lies against the seal groove 72 of the top surface 69 in use. A seal such as an API seal ring may be placed in the space formed by the two seal grooves.

A variety of different tools may therefore be firmly and reliably attached to the top surface 69, with the tools having access to the interior of the sealing device, for operations that require well control. An example of such a tool is a blow-out preventer (BOP).

This arrangement could also be used to deploy a packer or bridge plug within the well bore. As the skilled reader will appreciate, a packer or bridge plug may be hydraulically activated, so that it is set against the casing of the wellbore when supplied with fluid above a threshold pressure. In embodiments involving a packer or bridge plug, a tubing may be provided within the sealing device that leads down the wellbore to a packer or bridge plug, with the tubing being in fluid communication with the central aperture 71 formed in the top surface 69. One or more burst discs may be provided within the tubing, above the packer or bridge plug. To set the packer or bridge plug, pressurised fluid is introduced into the tubing through the central aperture 71, at sufficient pressure to activate the packer or bridge plug so that it is set within the wellbore. The pressure can then be further increased to rupture the burst disc(s).

Any other type of packer or bridge plug can also be used in conjunction with sealing devices embodying the present invention, and the skilled person will readily appreciate how this may be achieved.

It is also envisaged that tools or other connectors may be attached to the top surface of a sealing device embodying the invention to allow access for further tools to pass through the sealing device to carry out operations below the level of the sealing device. In some circumstances it may be necessary to allow work string access to regions below the level of the sealing device. Coiled tubing may also be passed through the aperture in the sealing device to extend below the level of the sealing device.

It should also be appreciated that any suitable attachment means may be provided to allow a tool to be attached to the top surface of a sealing device embodying the present invention. A great variety of attachment methods are currently in use, and any of these methods may be used with the invention.

Where a ring-shaped element is used to grip the exterior of the casing (for instance in the case of the first or third sealing devices 1, 74 described above), it may be preferable to include cut-out sections in the ring shape to increase the flexibility of the ring. Such cut-out sections may include, for example, one or more generally T-shaped cut-outs, which extend upwardly from the bottom edge of the ring, or alternatively may extend downwardly from the top edge of the ring. A plurality of such cut-outs may be provided, spaced apart around the circumference of the ring.

As mentioned above in connection with the embodiment (shown in FIGS. 18 to 20) involving a flow diverter, it is common to have inner and outer casings, which may be generally coaxial with each other.

For many operations where inner and outer casings are present, it is likely to be most simple to use a sealing device which fits over the outer surface of the outer casing, and both the slip arrangement and the seal element are arranged to engage with the outer surface of the outer casing (for instance, as shown in FIGS. 1 to 21. This allows the sealing device to function reliably without any interference from the inner casing. While the sealing device may be configured to engage with the inner casing, or with both the inner casing and the outer casing (and both of these possibilities are contemplated within the scope of the present invention), it is often not possible to rely on the inner casing being substantially coaxial with the outer casing, or on the inner casing being in good condition, particularly where the casing in question has been used for some time and is now to be abandoned.

In circumstances where it is unclear whether the casing to be sealed will have an inner casing or not, the safest option is therefore likely to be to use an embodiment which fits over the outer surface of the outer casing, and both the slip arrangement and the seal element are arranged to engage with the outer surface of the outer casing. This is also the case where an inner casing is not present, but the interior of the casing may be obstructed by discarded tools or equipment, debris, or anything else.

However, it is also envisaged that a sealing device embodying the present invention may engage with both the inner casing and the outer casing. Either the slip arrangement may engage with one of the casings, and the seal element will engage with the other, or indeed respective slip arrangements and/or seal elements may engage with both casings. It is also envisaged that a sealing device embodying the invention may seal the annular or substantially annular gap between the outer casing and the inner casing, while leaving the inner casing substantially unobstructed.

In other examples, in embodiments where the slip arrangement and seal element both engage the outer surface of the outer casing, there may be a relatively large axial distance (for instance, more than 3 feet (90 cm) or more than 6 feet (180 cm)) between the slip arrangement and seal element and the closed top end of the sealing device. This may then be used where the inner casing protrudes by some distance out of the free end of the outer casing. The slip arrangement and seal device may then engage the outer surface of the outer casing, with the protruding length of inner casing being accommodated within the main body of the sealing device.

It is envisaged that this might be the case where, for example, the outer casing is deliberately cut to a shorter length than the inner casing. This would leave a protruding length of inner casing on which any necessary operations could be carried out, e.g. sealing the inner casing entirely. The sealing device could then be placed over the inner and outer casings to grip and seal against the outer casing.

Although several embodiments are described above, it is envisaged that any feature of any of the embodiments can be combined with features from any other embodiment(s), as long as these features are not incompatible with each other. It is not intended that the embodiments should be seen as separate from each other, with features that cannot be transferred between the embodiments.

In this document terms such as "upper", "lower", "top" and "bottom" are used. These refer to the expected orientation in which the sealing devices will be used, i.e. on a casing that protrudes vertically upwardly. It is envisaged, however, that devices embodying the present invention may be used on casings that extend in any direction, including at an angle to vertically upwards, but also including horizontally or even vertically downwards. Terms such as "upper" and "lower" should be construed accordingly.

When used in this specification and claims, the terms "comprises" and "comprising" and variations thereof mean that the specified features, steps or integers are included. The terms are not to be interpreted to exclude the presence of other features, steps or components.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

The invention claimed is:

1. A sealing device for sealing a free end of a generally tubular object, the sealing device comprising:
   a main body comprising either a sleeve which may, when the sealing device is engaged with the free end of a generally tubular object, surround the free end of the generally tubular object, or a protrusion which may, when the sealing device is engaged with the free end of the generally tubular object, be inserted into the interior of the free end of the generally tubular object;
   a grip arrangement which is connected to or supported by the main body, and positioned to lie against or adjacent a surface of the generally tubular object when the sealing device is engaged with the free end of the generally tubular object, wherein the grip arrangement is radially moveable with respect to a central axis of the main body;
a grip drive arrangement operable to drive the grip arrangement radially with respect to the central axis of the main body, towards the surface of the generally tubular object; and
a stop member configured to automatically arrest relative motion of the generally tubular object with respect to the sleeve or the protrusion of the sealing device when the sealing device is engaged with a first level of force with the free end of the object, the stop member comprising a resilient member configured (i) to resist the first level of force and arrest the relative motion and (ii) to deform to allow further relative movement of the generally tubular object with respect to the sleeve or the protrusion of the sealing device when the grip drive arrangement is operated to drive the grip arrangement radially towards the surface of the generally tubular object,
wherein, when the sealing device is engaged with the free end of the generally tubular object, if a force is exerted on the main body to remove the main body from the free end of the generally tubular object, the force will tend to move the grip arrangement further radially inwardly towards the central axis of the main body, if the grip arrangement is positioned to lie against or adjacent the outer surface of the generally tubular object, or further radially outwardly away from the central axis of the main body, if the grip arrangement is positioned to lie against or adjacent the inner surface of the generally tubular object.

2. A sealing device according to claim 1, further comprising a tapered deflection surface which is positioned to interact with the grip arrangement, wherein the grip arrangement and the deflection surface are axially moveable relative to each other, wherein the force exerted on the main body will move the deflection surface with respect to the grip arrangement such that the grip arrangement moves radially inwardly.

3. A sealing device according to claim 2, wherein the deflection surface comprises a plurality of separate, spaced apart deflection surfaces.

4. A sealing device according to claim 2, wherein the deflection surface comprises two or more turns of a helical or substantially helical track, and wherein the grip arrangement comprises a corresponding helical surface against which the track may bear.

5. A sealing device for sealing a free end of a generally tubular object, the sealing device comprising:
a main body comprising either a sleeve which may, when the sealing device is engaged with the free end of a generally tubular object, surround the free end of the generally tubular object, or a protrusion which may, when the sealing device is engaged with the free end of the generally tubular object, be inserted into the interior of the free end of the generally tubular object;
a grip arrangement which is connected to or supported by the main body, and positioned to lie against or adjacent a surface of the generally tubular object when the sealing device is engaged with the free end of the generally tubular object, wherein the grip arrangement is radially moveable with respect to a central axis of the main body;
a grip drive arrangement operable to drive the grip arrangement radially with respect to the central axis of the main body, towards the surface of the generally tubular object; and
a stop member configured to automatically arrest relative motion of the generally tubular object with respect to the sleeve or the protrusion of the sealing device when the sealing device is engaged with a first level of force with the free end of the object, wherein the stop member is hydraulically actuated, the stop member comprising a member having an adjustable height, which may be set to a first height when the sealing device is engaged with the free end of the generally tubular object, and which may then be set to a second height, to allow further relative movement of the generally tubular object with respect to the sleeve or the protrusion of the sealing device when the grip drive arrangement is operated to drive the grip drive arrangement towards the surface of the generally tubular object,
wherein, when the sealing device is engaged with the free end of the generally tubular object, if a force is exerted on the main body to remove the main body from the free end of the generally tubular object, the force will tend to move the grip arrangement further radially inwardly towards the central axis of the main body, if the grip arrangement is positioned to lie against or adjacent the outer surface of the generally tubular object, or further radially outwardly away from the central axis of the main body, if the grip arrangement is positioned to lie against or adjacent the inner surface of the generally tubular object.

6. A method of sealing the free end of a generally tubular object with a sealing device, the sealing device comprising:
a main body comprising either a sleeve which may, when the sealing device is engaged with the free end of a generally tubular object, surround the free end of the generally tubular object, or a protrusion which may, when the sealing device is engaged with the free end of the generally tubular object, be inserted into the interior of the free end of the generally tubular object, the main body having a central axis, wherein the sealing device has a first fully inserted position at which the free end of the generally tubular object contacts a part of the sealing device to limit further axial movement;
a grip arrangement which is connected to or supported by the main body, and positioned to lie against or adjacent a surface of the generally tubular object when the sealing device is engaged with the free end of the generally tubular object, wherein the grip arrangement is radially moveable with respect to the central axis of the main body; and
a grip drive arrangement operable to drive the grip arrangement radially with respect to the central axis of the main body, towards the surface of the generally tubular object,
the method comprising:
engaging the sealing device with the free end of the generally tubular object so that the free end of the generally tubular object is spaced apart axially from the part of the sealing device and occupies a second partially inserted position spaced away from the first fully inserted position; and
activating the grip drive arrangement to drive the grip drive arrangement radially with respect to the main body, and with respect to the central axis of the main body, towards the surface of the generally tubular object.

7. The method of claim 6, wherein the act of engaging the sealing device with the free end of the generally tubular object so that the free end of the generally tubular object is spaced apart axially from the part of the sealing device comprises (a) initially engaging the sealing device with the free end of the generally tubular object in the first fully inserted position, (b) subjecting the sealing device and the generally tubular object to relative translation thereof, and (c) engaging the sealing device with the free end of the generally tubular object at the second partially inserted position.

8. The method of claim 7, wherein initially engaging the sealing device with the free end of the tubular object in the first fully inserted position comprises moving the sealing device axially in a first direction until further movement in the first direction is limited by contact between the part of the sealing device and the free end of the tubular object and then moving the sealing device axially in a second direction from the first fully inserted position to the second partially inserted position.

9. The method of claim 7, wherein the sealing device is suspended above the generally tubular object with cables, and wherein the sealing device is movable axially relative to the generally tubular object in a generally vertical direction.

10. The method of claim 6, wherein the generally tubular object includes markings on an exterior thereof to indicate the second partially inserted position.

11. The method of claim 6, further comprising monitoring a position of the sealing device relative to the generally tubular object with a monitoring device.

12. The method of claim 6, wherein the part of the sealing device that limits further axial movement comprises a flange.

* * * * *